United States Patent
Fridman et al.

(10) Patent No.: US 11,842,121 B2
(45) Date of Patent: Dec. 12, 2023

(54) APPARATUS, SYSTEM AND METHOD OF SOUND CONTROL

(71) Applicant: SILENTIUM LTD., Nes Ziona (IL)

(72) Inventors: Tzvi Fridman, Nes Tziona (IL); Ziv Hermon, Maccabim (IL); Yoel Naor, Kibbutz Naan (IL); Yuval Serfaty, Tel Aviv (IL)

(73) Assignee: SILENTIUM LTD., Nes Ziona (IL)

( * ) Notice: Subject to any disclaimer, the term of this patent is extended or adjusted under 35 U.S.C. 154(b) by 0 days.

(21) Appl. No.: 17/734,092

(22) Filed: May 1, 2022

(65) Prior Publication Data
US 2022/0261214 A1 Aug. 18, 2022

Related U.S. Application Data

(63) Continuation of application No. 16/734,338, filed on Jan. 5, 2020, now Pat. No. 11,385,859.
(Continued)

(51) Int. Cl.
*G06F 3/16* (2006.01)
*H04R 29/00* (2006.01)
*G10L 25/51* (2013.01)

(52) U.S. Cl.
CPC ............ *G06F 3/165* (2013.01); *G10L 25/51* (2013.01); *H04R 29/001* (2013.01); *H04R 2430/01* (2013.01); *H04R 2499/13* (2013.01)

(58) Field of Classification Search
CPC .......... G06F 3/165; H04S 7/303; H04S 3/008; H04S 7/30; H04S 7/307; H04S 7/301;
(Continued)

(56) References Cited

U.S. PATENT DOCUMENTS

| 9,431,001 B2 | 8/2016 | Cherkassky et al. |
| 9,928,824 B2 | 3/2018 | Barath et al. |

(Continued)

FOREIGN PATENT DOCUMENTS

| CN | 101682814 | 3/2010 |
| CN | 106998518 | 8/2017 |

(Continued)

OTHER PUBLICATIONS

Office Action for Chinese Patent Application No. 202080007954.9, dated Oct. 17, 2022, 4 pages.
(Continued)

*Primary Examiner* — Yogeshkumar Patel
(74) *Attorney, Agent, or Firm* — Shichrur & Co.

(57) ABSTRACT

Some demonstrative embodiments include apparatuses, systems and methods of sound control. For example, an apparatus may be configured to process one or more audio inputs to be heard in one or more personal sound zones, and a plurality of monitoring inputs, wherein the plurality of monitoring inputs represent acoustic sound at a plurality of predefined monitoring sensing locations, which are defined within the one or more personal sound zones; determine a sound control pattern based on the one or more audio inputs, and the plurality of monitoring inputs, the sound control pattern comprising a plurality of sound control signals configured to drive a respective plurality of acoustic transducers such that the one or more audio inputs are to be heard in the one or more personal sound zones; and output the plurality of sound control signals to the plurality of acoustic transducers.

33 Claims, 18 Drawing Sheets

Related U.S. Application Data

(60) Provisional application No. 62/788,868, filed on Jan. 6, 2019.

(58) Field of Classification Search
CPC ....... G10L 25/51; H04R 29/001; H04R 3/005; H04R 3/12; H04R 3/04; H04R 2430/01; H04R 2499/13; H04R 2499/15; G10K 11/34; G10K 2210/3046; G10K 2210/1282

See application file for complete search history.

(56) References Cited

U.S. PATENT DOCUMENTS

| | | | |
|---|---|---|---|
| 10,080,088 B1* | 9/2018 | Yang | H04S 7/30 |
| 11,385,859 B2 | 7/2022 | Fridman et al. | |
| 2010/0124337 A1 | 5/2010 | Wertz et al. | |
| 2010/0158263 A1 | 6/2010 | Katzer et al. | |
| 2013/0259254 A1* | 10/2013 | Xiang | H04K 3/45 |
| | | | 381/73.1 |
| 2016/0088388 A1 | 3/2016 | Franck et al. | |
| 2016/0133244 A1 | 5/2016 | Tzirkel-Hancock et al. | |
| 2016/0171964 A1 | 6/2016 | Kim et al. | |
| 2016/0196818 A1* | 7/2016 | Christoph | H04S 7/301 |
| | | | 381/71.6 |
| 2017/0032806 A1 | 2/2017 | Konjeti et al. | |
| 2017/0150256 A1 | 5/2017 | Christoph et al. | |
| 2018/0012589 A1 | 1/2018 | MacNeille et al. | |
| 2018/0146290 A1 | 5/2018 | Christoph et al. | |
| 2018/0233159 A1 | 8/2018 | Hera et al. | |
| 2019/0045316 A1 | 2/2019 | Schneider et al. | |

FOREIGN PATENT DOCUMENTS

| | | |
|---|---|---|
| EP | 1761110 | 3/2007 |
| EP | 3 232 688 | 10/2017 |

OTHER PUBLICATIONS

Marcos F. Simón Gálvez, Stephen J. Elliott, and Jordan Cheer, "Time Domain Optimization of Filters Used in a Loudspeaker Array for Personal Audio", IEEE/ACM Transactions on Audio, Speech, and Language Processing, vol. 23, No. 11, Nov. 2015, 10 pages.

Office Action for U.S. Appl. No. 16/734,338, dated Apr. 9, 2020, 16 pages.

Search Report and Written Opinion for PCT/IB2020/050041, dated May 5, 2020, 10 pages.

Office Action for U.S. Appl. No. 16/734,338, dated Oct. 9, 2020, 31 pages.

Advisory Action for U.S. Appl. No. 16/734,338, dated Jan. 12, 2021, 19 pages.

International Preliminary Report on Patentability for International Application No. PCT/IB2020/050041, dated Jul. 15, 2021, 7 pages.

Office Action for U.S. Appl. No. 16/734,338, dated Sep. 30, 2021, 31 pages.

Notice of Allowance for U.S. Appl. No. 16/734,338, dated Jan. 31, 2022, 14 pages.

Office Action for Indian Patent Application No. 202127030766, dated Apr. 7, 2022, 6 pages.

Office Action for Chinese Patent Application No. 202080007954.9, dated Jun. 6, 2022, 19 pages (including one page of English translation).

Office Action for Korean Patent Application No. 10-2021-7023593, dated Nov. 17, 2022, 12 pages (including 6 pages of English translation).

Office Action for Japanese Patent Application No. 2021-539094, dated Sep. 6, 2022, 4 pages.

Office Action for Chinese Patent Application No. 202080007954.9, dated Jan. 28, 2023, 9 pages.

Office Action for Japanese Patent Application No. 2021-539094, dated Dec. 16, 2022, 4 pages.

Stuart Goose, et al., "PAZ: In-Vehicle Personalized Audio Zones", IEEE Multimedia, IEEE, 2016, vol. 23, Issue 4, pp. 32-41, 11 pages.

Search Report for European Patent Application No. 20736001.7, dated Sep. 27, 2022, 9 pages.

Notice of Allowance for Korean Patent Application No. 10-2021-7023593, dated May 29, 2023, 8 pages (including 1 page of English translation).

Office Action for Chinese Patent Application No. 202080007954.9, dated Jul. 28, 2023, 16 pages.

Office Action for Japanese Patent Application No. 2021-539094, dated Sep. 8, 2023, 3 pages.

\* cited by examiner

APPARATUS, SYSTEM AND METHOD OF SOUND CONTROL

CROSS-REFERENCE

This application claims the benefit of and priority from U.S. Provisional Patent Application No. 62/788,868, entitled "APPARATUS, SYSTEM AND METHOD OF SOUND CONTROL", filed Jan. 6, 2019, the entire disclosure of which is incorporated herein by reference.

TECHNICAL FIELD

Embodiments described herein generally relate to sound control.

BACKGROUND

There may be many multi-sound environments, for example, a train, a bus, an airplane, and the like, in which several users may generate and/or listen to multiple different sounds.

In such multi-sound environments, a user may be disturbed by sounds of one or more other user.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation.

Furthermore, reference numerals may be repeated among the figures to indicate corresponding or analogous elements. The figures are listed below.

DETAILED DESCRIPTION

Figure 1:
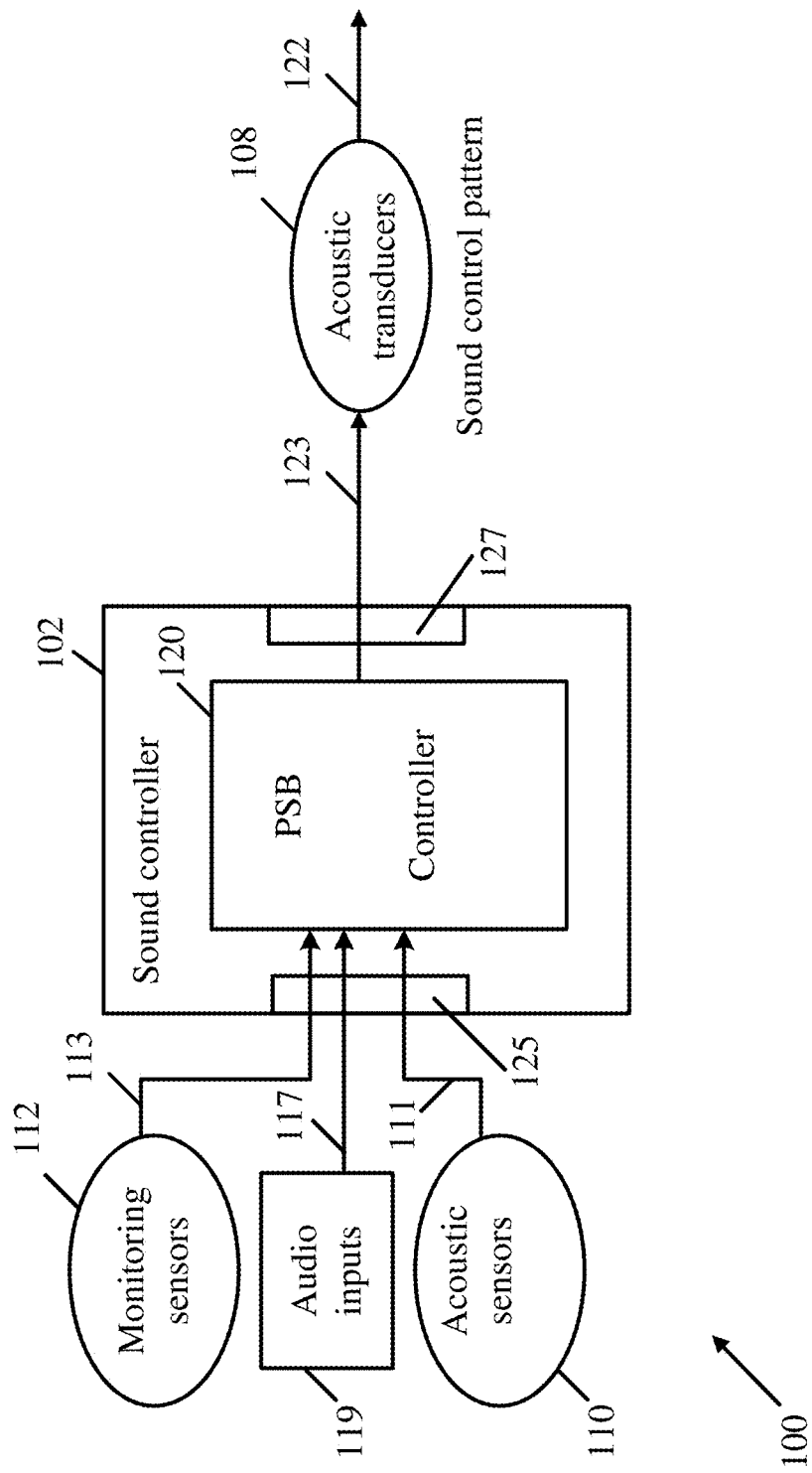
FIG. 1 is a schematic block diagram illustration of a sound control system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some demonstrative embodiments include systems and methods, which may be efficiently implemented for controlling sound, for example, within a predefined area and/or a zone, e.g., as described below.

Some demonstrative embodiments may include methods and/or systems configured to control sound within at least one personal sound zone (also referred to as "Personal Sound Bubble (PSB)"), e.g., as described below.

In some demonstrative embodiments, a sound control system (also referred to as a "PSB system") may be configured to produce a sound control pattern, which may be based on at least one audio input, for example, such that at least one personal sound zone, may be created based on the audio input.

In some demonstrative embodiments, the sound control system may be configured to control sound within at least one predefined location, area or zone, e.g., at least one PSB, for example, based on audio to be heard by a user in the PSB, e.g., as described below.

In some demonstrative embodiments, the sound control system may be configured to control a sound contrast between one or more first sound patterns and one or more second sound patterns in the PSB, e.g., as described below.

In some demonstrative embodiments, for example, the sound control system may be configured to control a sound contrast between one or more first sound patterns of audio to be heard by a user in the PSB, and one or more second sound patterns, e.g., as described below.

In some demonstrative embodiments, for example, the sound control system may be configured to selectively increase and/or amplify the sound energy and/or wave amplitude of one or more types of acoustic patterns within the PSB, e.g., based on the audio to be heard in the PSB; to selectively reduce and/or eliminate the sound energy and/or wave amplitude of one or more types of acoustic patterns within the PSB, e.g., based on audio to be provided to one or more other PSBs; and/or to selectively and/or to selectively maintain and/or preserve the sound energy and/or wave amplitude of one or more other types of acoustic patterns within the PSB.

In some demonstrative embodiments, the sound control system may be configured to control the sound within the PSB based on any other additional or alternative input or criterion, e.g., as described below.

In some demonstrative embodiments, for example, the sound control system may be configured to control the sound within the PSB based, for example, on one or more attributes of sound in an environment, for example, outside of the PSB, e.g., an environment surrounding the PSB, and/or one or more other PSBs, e.g., neighbor PSBs, as described below.

In some demonstrative embodiments, for example, the sound control system may be configured to control the sound within the PSB based, for example, on one or more attributes of noise and/or unwanted sound, for example, to reduce and/or eliminate one or more sound patterns within the PSB, e.g., as described below.

In some demonstrative embodiments, for example, the sound control systems and/or methods described herein may be configured to control in any other manner the sound energy and/or wave amplitude of one or more acoustic patterns within the PSB, for example, to affect, alter and/or modify the sound energy and/or wave amplitude of one or more acoustic patterns within a predefined zone.

In some demonstrative embodiments, a personal sound zone may include a three-dimensional zone, e.g., defining a volume in which sound is to be controlled.

In one example, the personal sound zone may include a spherical volume, for example, a bubble-like volume, or any other volume having any other shape or form, and the PSB system may be configured to control the sound within the spherical volume.

In other embodiments, the personal sound zone may include any other suitable volume, which may be defined, for example, based on one or more attributes of a location at which the personal sound zone is to be maintained.

Figure 2:
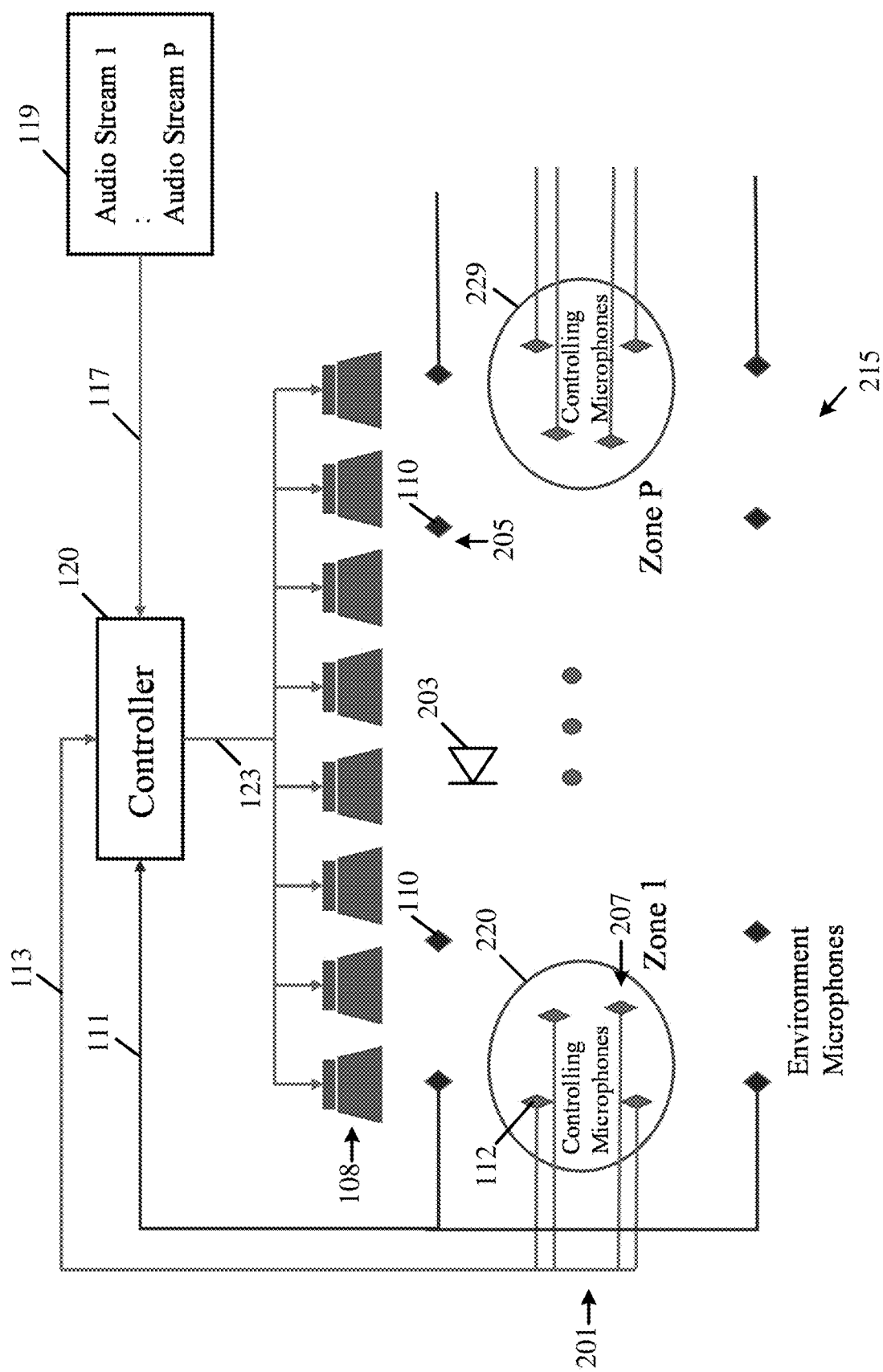
FIG. 2 is a schematic illustration of a deployment scheme of components of the sound control system, in accordance with some demonstrative embodiments.

Reference is now made to FIG. 1, which schematically illustrates a sound control system 100 (also referred to as a "PSB system"), in accordance with some demonstrative embodiments. Reference is also made to FIG. 2, which schematically illustrates of a deployment scheme 200 of components of PSB system 100, in accordance with some demonstrative embodiments.

In some demonstrative embodiments, system 100 may be configured to control sound within at least one personal sound zone 201, e.g., including at least a personal sound zone 220, denoted "Zone 1", for example, based at least on at least one audio input. For example, a PSB system may be configured to control audio within at least one PSB 220, for example, based on the at least one audio input to be heard by a user in the PSB 220, e.g., as described below.

In some demonstrative embodiments, personal sound zone 220 may include a three-dimensional zone. For example, personal sound zone 220 may include a spherical zone.

In one example, the personal sound zone 220 may include a predefined zone and/or area, which may by suitable for a single person, an animal, a plant, a device, e.g., a smart home device, or any other object.

In one example, the personal sound zone 220 may include a three-dimensional zone, e.g., defining a volume in which the sound is to be controlled.

In some demonstrative embodiments, the audio input may include audio designated to be heard in the personal sound zone, e.g., as described below.

In some demonstrative embodiments, system 100 may be configured to control sound within a plurality of personal sound zones 201, for example, including two or more personal sound zones, e.g., as described below.

In some demonstrative embodiments, the plurality of sound zones 201 may include P personal sound zones, e.g., including the personal sound zone 220 and least one other personal sound zone 229, denoted "Zone P".

In some demonstrative embodiments, the plurality of personal sound zones 201 may be configured, for example, for one or more, e.g., several, persons, animals, plants, devices or any other objects, for example, a computing device or a personal assistant device, e.g., as described below.

In one example, some environments, e.g., multi-sound environments, such as vehicles, trains, airplanes, work spaces, homes, public places, and the like, may include a space shared by a plurality of users, where each user may want to hear different sound, e.g., audio, music, voice, or the like. According to this example, there may be a need to allow the plurality of users to enjoy an individual sound experience, e.g., as described below.

In some demonstrative embodiments, sound control system 100 may be configured to create a separation between personal sound zones of the plurality of sound zones 201, for example, to implement sound separation in such multi-sound environments, e.g., as described below.

In some demonstrative embodiments, sound control system 100 may be configured to divide an environment 215, e.g., a multi-sound environment, into several virtual independent zones, e.g., in the form of several personal sound zones, for example, such that a personal sound experience may be delivered, for example, to each personal sound zone, e.g., as described below.

In some demonstrative embodiments, sound control system 100 may be configured to use an array of acoustic transducers 108, e.g., loudspeakers, deployed in the environment 215, for example, in a way which may be configured to divide the environment into the plurality of personal sound zones 201, e.g., as described below.

Some demonstrative embodiments are described herein with respect to a sound control system utilizing a plurality of loudspeakers. In other embodiments, the sound control system may include one or more other types of acoustic transducers, e.g., in addition to or instead of one or more of the loudspeakers.

In some demonstrative embodiments, sound control system 100 may be configured to implement an advanced signal processing method, for example, to divide the environment 215 into the plurality of personal sound zones 201, e.g., as described below.

In some demonstrative embodiments, sound control system 100 may enable and/or support a focused sound transmission towards a personal sound zone, e.g., personal sound zone 220, for example, while reducing, minimizing, or even eliminating, the sound intensity elsewhere, for example, in the other personal sound zone of the plurality of personal sound zones 201, and/or at one or more other locations in environment 215 outside the sound zone 220, e.g., as described below.

In some demonstrative embodiments, sound control system 100 may enable and/or support providing to the plurality of personal sound zones 201 with independent audio content, for example, even in environments, e.g., a homogeneous environment, such as a room or a car. For example, a listener in the environment, e.g., each listener, may be able to enjoy his own choice of audio, e.g., music, voice, news, and the like, e.g., as described below.

In some demonstrative embodiments, sound control system 100 may be configured to be implemented in and/or to support various environments, e.g., as described below.

In some demonstrative embodiments, sound control system 100 may include a vehicular system, e.g., as described below.

In one example, sound control system 100 may be implemented as part of one or more vehicular systems of a vehicle, e.g., as described below. For example, sound control system 100 may be implemented within an interior of the vehicle. For example, the vehicle may include a bus, a van, a car, a truck, an airplane, a ship, a train, an autonomous driving vehicle, and/or the like.

In other embodiments, sound control system 100 may be implemented in conjunction with any other device, system and/or environment.

In one example, sound control system 100 may be configured to be implemented in and/or configured to support transportation environments, for example, airplanes, trains and/or cars, for example, to enable a user, e.g., each user, for example, a driver, a passenger, and/or a traveler, to enjoy his or her own choice of audio.

In one example, sound control system 100 may be configured to be implemented in and/or to support a home environment, for example, to enable and/or to support providing a tailored multimedia, e.g., TV, audio, video and/or gaming, experience to one or more users, while accommodating individual preferences of the users.

In one example, sound control system 100 may be configured to be implemented in and/or to support a work environment, for example, to allow privacy and/or to improve confidentiality within the work environment, e.g., for users sharing a same workspace.

In one example, sound control system 100 may be configured to be implemented in and/or to support a public environment, for example, to allow and/or to support audio transition of audio signals towards one or more relevant zones in the public environment.

In another example, sound control system 100 may be configured to be implemented in and/or to support any other environment.

In some demonstrative embodiments, sound control system 100 may be configured to use the plurality of acoustic transducers 108, e.g., loudspeakers, for example, to focus one or more input audio signals 117 into a specific personal sound zone, for example, such that a personal sound zone, e.g., each personal sound zone, may experience a respective audio signal, for example, a desired audio signal or signals, e.g., as described below.

In some demonstrative embodiments, sound control system 100 may implement an advanced signal processing method, for example, to increase, e.g., maximize, a sound intensity of one or more input audio signals of signals 117, for example, in a respective personal sound zone, for example, while reducing, e.g., minimizing or even eliminating, the sound intensity of one or more undesired audio signals in the personal sound zone 220, e.g., as described below.

In some demonstrative embodiments, sound control system 100 may be configured to implement one or more signal processing techniques, for example, to individually process sound for the plurality of sound control zones 201, for example, increase, e.g., maximize, the sound intensity at each zone of the plurality of personal sound zones 201, e.g., as described below.

In some demonstrative embodiments, sound control system 100 may be configured to implement one or more signal processing techniques, for example, to jointly process sound for two or more of the sound control zones of the plurality of personal sound zones 201, for example, increase, e.g., maximize, the sound intensity at each zone of the plurality of personal sound zones 201, e.g., as described below.

In some demonstrative embodiments, sound control system 100 may be configured to provide the audio to the personal sound zone, for example, with reduced, e.g., minimal, influence on audio quality, for example, while providing a personal sound experience, for example, without disturbing, or minimally disturbing, others who are not located in the personal sound zone, e.g., as described below.

In some demonstrative embodiments, sound control system 100 may include a sound controller 102 configured to control sound, for example, within environment 215, e.g., as described below.

In one example, the environment 215 may include an interior of a vehicle, a shared office, and/or any other environment.

In some demonstrative embodiments, sound controller 102 may include an input 125 configured to receive one or more audio inputs 117 to be heard in one or more personal sound zones, e.g., of the plurality of personal sound zones 201, e.g., as described below. For example, the one or more audio inputs 117 may be from one or more audio sources 119.

In one example, the one or more audio inputs 117 may include, for example, music, phone conversations, human-machine interaction sounds, navigation inputs, vehicular alerts, and/or any other sound and/or audio inputs.

In some demonstrative embodiments, input 125 may be configured to receive a plurality of monitoring inputs 113, e.g., as described below.

In some demonstrative embodiments, the plurality of monitoring inputs 113 may represent acoustic sound at a plurality of predefined monitoring sensing locations 207, which may be defined within the one or more personal sound zones of the plurality of personal sound zones 201, e.g., as described below.

In some demonstrative embodiments, sound controller 102 may include a controller 120 configured to determine a sound control pattern 123 based on the one or more audio inputs 117, and the plurality of monitoring inputs 113, e.g., as described below.

In some demonstrative embodiments, the sound control pattern 123 may include a plurality of sound control signals configured to drive the plurality of acoustic transducers 108, e.g., respectively, such that the one or more audio inputs 117 may be heard in the one or more personal sound zones, for example, of the plurality of personal sound zones 201, e.g., as described below.

In some demonstrative embodiments, sound controller 102 may include an output 127 to output the plurality of sound control signals to the plurality of acoustic transducers 108, e.g., as described below.

In some demonstrative embodiments, controller 120 may be configured to determine the sound control pattern 123, for example, based on environment acoustic information, e.g., as described below.

In other embodiments, controller 120 may be configured to determine the sound control pattern 123, for example, even without using the environment acoustic information.

In some demonstrative embodiments, input 125 may be configured to receive environment acoustic information 111 representing environment acoustic sound at a plurality of predefined environment locations 205, which may be defined with respect to the environment 215 including the one or more personal sound zones 201, e.g., as described below.

In one example, controller 120 may be configured to improve a quality of an audio stream transmitted to a personal sound zone, for example, using acoustic sensors, which may be configured as "'environment acoustic sensors" to "listen" to environment sound and/or noises. For example, implementing the environment acoustic sensors may provide a technical advantage of allowing sound control system 100 to control, e.g., in real time, frequencies heard by a listener in the personal sound zone 220, for example, at any time, e.g., as described below.

In some demonstrative embodiments, controller 120 may be configured to determine the sound control pattern 123, for example, based on the environment acoustic information 111, e.g., as described below.

In some demonstrative embodiments, the environment acoustic information 111 may include information of acoustic sound sensed by an acoustic sensor 110 at an environment location 205 of the plurality of predefined environment locations 205, e.g., as described below.

In some demonstrative embodiments, the environment acoustic information 111 may include information of an audio signal, e.g., of the one or more audio inputs 117, acoustic sound generated by a predefined audio source 203 and/or any other information relating to sound in one or more locations of environment 215, e.g., as described below.

For example, the predefined audio source 203 may include a speaker of a cellular phone, sound alerts of a vehicular safety system, and/or the like.

In other embodiments, the environment acoustic information 111 may include any other additional or alternative acoustic information relating to the environment 215.

In some demonstrative embodiments, controller 120 may be configured to determine a plurality of selected frequencies to be included in the sound control pattern 123, e.g., as described below.

In some demonstrative embodiments, controller 120 may be configured to select the plurality of selected frequencies from a frequency spectrum, for example, based on the environment acoustic information 111 and the one or more audio inputs 117, e.g., as described below.

In some demonstrative embodiments, controller 120 may be configured to determine the plurality of selected frequencies, for example, based on projected audio and projected environment sound, e.g., as described below.

In some demonstrative embodiments, the projected audio may be based, for example, on a projection of an audio input 117, which is to be heard at the personal sound zone 220, by a transfer function from the plurality of transducers 108 to the personal sound zone 220, e.g., as described below.

In some demonstrative embodiments, the projected environment sound may be based, for example, on a projection of the environment acoustic sound by a transfer function from the plurality of predefined environment locations 205 to the personal sound zone 220, e.g., as described below.

In some demonstrative embodiments, controller 120 may be configured to determine whether a particular frequency is to be included in the plurality of selected frequencies, for example, based on the projected audio at the particular frequency, and the projected environment sound at the particular frequency, e.g., as described below.

In some demonstrative embodiments, controller 120 may be configured to determine that the particular frequency is to be included in the plurality of selected frequencies, for example, when a difference between the projected audio at the particular frequency and the projected environment sound at the particular frequency is greater than a predefined threshold, e.g., as described below. The threshold may be defined, for example, based on a desired contrast between audio to be heard in a personal sound zone and environment sound affecting the personal sound zone.

In some demonstrative embodiments, controller 120 may be configured to determine the plurality of sound control signals, for example, based on one or more sets of weight vectors corresponding to the one or more personal sound zones 210, e.g., as described below.

In some demonstrative embodiments, a set of weight vectors corresponding to a personal sound zone 220 may include a plurality of weight vectors corresponding to the plurality of acoustic transducers 108, respectively, e.g., as described below.

In some demonstrative embodiments, a weight vector in the set of weight vectors may be based, for example, on an acoustic transfer function between an acoustic transducer 108 of the plurality of acoustic transducers 108 and the personal sound zone 220, e.g., as described below.

In some demonstrative embodiments, controller 120 may be configured to determine a sound control signal for a particular acoustic transducer 108, for example, by applying to an audio input 117 to be heard in the personal sound zone 220 a weight vector corresponding to the particular acoustic transducer 108 from the set of weight vectors corresponding to the personal sound zone 220, e.g., as described below.

In some demonstrative embodiments, controller 120 may be configured to determine the set of weight vectors corresponding to the personal sound zone 220, for example, based on a first plurality of acoustic transfer functions and a second plurality of acoustic transfer functions, e.g., as described below.

In some demonstrative embodiments, the first plurality of acoustic transfer functions may include acoustic transfer functions between the plurality of acoustic transducers 108 and the personal sound zone 220, e.g., as described below.

In some demonstrative embodiments, the second plurality of acoustic transfer functions may include acoustic transfer functions between the plurality of acoustic transducers 108 and one or more monitoring locations outside the personal sound zone 220, for example, one or more monitoring locations in one or more other personal sound zones and/or one or more monitoring locations in environment 215, e.g., as described below.

In some demonstrative embodiments, controller 120 may be configured to adjust one or more acoustic transfer functions in the first or second pluralities of acoustic transfer functions, for example, based on the environment acoustic information 111, which represents the environment acoustic sound at the plurality of predefined environment locations 205, which may be defined with respect to the environment 215 including the one or more personal sound zones 201, e.g., as described below.

In some demonstrative embodiments, controller 120 may be configured to adjust the one or more acoustic transfer functions in the first or second pluralities of acoustic transfer functions, for example, based on a change in the location of the personal sound zone 220, e.g., as described below.

In one example, environment 215 may include an interior of a vehicle and the personal sound zone 220 may include an area at a vicinity of a head of a traveler, e.g., a driver or a passenger. For example, the personal sound zone 220 may be defined to cover an area near or around at least one ear of the traveler. According to this example, the change in the location of the personal sound zone 220 may include, for example, a movement of the headrest and/or seat of the traveler, e.g., a movement up, down, backward and/or forward, which may move the head of the driver. In one example, controller 120 may be configured to receive position information of a position of the seat and/or headrest, for example, from a vehicular system of the vehicle, and controller 120 may be configured to adjust one or more acoustic transfer functions for the personal sound zone based on the position information.

In some demonstrative embodiments, controller 120 may be configured to adjust the one or more acoustic transfer functions in the first or second pluralities of acoustic transfer functions, for example, based on environment parameter information of one or more environmental parameters of the environment 215, e.g., as described below.

In one example, the environment parameter information of environment 215 may include, for example, a temperature in environment 215, e.g., a temperature in a vehicle, which may be received from one or more vehicular systems, e.g., an air condition vehicular system, for example, when system 100 is implemented in a vehicle. According to this example, controller 120 may be configured to receive temperature information and/or any other information of the environment in the vehicle, for example, from a system controller of the vehicle, and controller 120 may be configured to adjust one or more acoustic transfer functions for the personal sound zone based on the environment parameter information.

In some demonstrative embodiments, controller 120 may be configured to determine the set of weight vectors corresponding to the personal sound zone 220, for example, based on a criterion relating to a contrast between a first acoustic energy and a second acoustic energy, e.g., as described below.

In some demonstrative embodiments, the first acoustic energy may include an acoustic energy at the personal sound zone 220, for example, based on the set of weight vectors corresponding to the personal sound zone, e.g., as described below.

In some demonstrative embodiments, the second acoustic energy may include an acoustic energy at one or more monitoring locations outside the personal sound zone 220, e.g., one or more locations in one or more other personal sound zones and/or at any other locations in environment 215, for example, based on the set of weight vectors corresponding to the personal sound zone 220, e.g., as described below.

In some demonstrative embodiments, the weight vector may include a plurality of weights corresponding to a respective plurality of acoustic frequencies, e.g., as described below.

In one example, the weight vector may include a plurality of weights corresponding to some or all of the plurality of selected frequencies from the frequency spectrum, e.g., as described below.

In some demonstrative embodiments, controller 120 may be configured to determine the sound control pattern 123, for example, based on at least first and second audio inputs 117, e.g., as described below.

In some demonstrative embodiments, the first audio input may be for a first personal sound zone, e.g., personal sound zone 220, the second audio input may be for a second personal sound zone, e.g., personal sound zone 229.

In some demonstrative embodiments, controller 120 may be configured to determine the sound control pattern 123, for example, based on a first plurality of monitoring inputs representing acoustic sound at a first plurality of monitoring sensing locations, which are defined within the first personal sound zone 220, and a second plurality of monitoring inputs representing acoustic sound at a second plurality of monitoring sensing locations, which are defined within the second personal sound zone 229, e.g., as described below.

In some demonstrative embodiments, controller 120 may be configured utilize Active Noise Cancellation (ANC) mechanism, for example, to dynamically control, reduce or eliminate noise from the environment 215 of personal sound zones 201.

In some demonstrative embodiments, controller 120 may be configured to determine the sound control pattern based on an ANC mechanism configured to reduce residual noise outside of the personal sound zone based on the one or more audio inputs and an input from an ANC microphone, e.g., as described below.

In some demonstrative embodiments, controller 120 may be configured to control the sound within the at least one personal sound zone 220, e.g., as described in detail below.

In some demonstrative embodiments, controller 120 may be configured to control the sound within the personal sound zone 220 based on audio input 117, which may be designated to be heard at the personal sound zone 220, e.g., as described below.

In some demonstrative embodiments, the controller 120 may be configured to receive the audio input 117, for example, from at least one sound source 119, e.g., as described below.

In some demonstrative embodiments, for example, sound sources 119 may include one or more digital audio sources, e.g., as described below.

In one example, sound sources 119 may include any audio source, configured to provide audio inputs 117, for example, audio signals, phone calls, navigation instruction, human voices, machine sound, system alerts, and/or any other voice, sound, and/or noise.

In some demonstrative embodiments, controller 120 may be configured to provide sound, e.g., audio, to the personal sound zone 220 in a localized manner, for example, such that one or more frequencies of the sound may be directed to sound zone 220, while controlling, e.g., reducing or eliminating, an effect of one or more frequencies of the sound outside of the personal sound zone 220, e.g., as described below.

In one example, controller 120 may be configured to control and/or localize the sound towards the personal sound zone 220, for example, based on the audio input 117, e.g., as described below.

For example, controller 120 may be configured to control and/or localize the sound in the personal sound zone 220, for example, in one or more hearable frequencies, e.g., only in the hearable frequencies related to a desired sound to be heard by a user, for example, to maximize a sound performance at the personal sound zone 220, e.g., as described below.

In some demonstrative embodiments, controller 120 may be configured to receive, e.g., via input 125, the plurality of monitoring inputs 113, which may represent the acoustic sound at the plurality of predefined monitoring sensing locations 207, which may be defined within personal sound zone 220.

In some demonstrative embodiments, controller 120 may receive the plurality of monitoring inputs 113 from a plurality of monitoring sensors 112, e.g., microphones, accelerometers, tachometers and the like, located at one or more of monitoring sensing locations 207, and/or from one or more virtual sensors configured to estimate the acoustic-audio at one or more of monitoring sensing locations 207, e.g., as described in detail below.

In some demonstrative embodiments, controller 120 may be configured to receive, e.g., via input 125, the environment acoustic information 111, which may represent environment acoustic sound at the plurality of predefined environment locations 205, which may be defined with respect to the environment 215 including personal sound zone 220, e.g., as described below.

In some demonstrative embodiments, controller 120 may receive the information 111 of acoustic sound from the plurality of acoustic sensors 110, e.g., microphones, accelerometers, tachometers and the like, located at one or more of the plurality of predefined environment locations 205, and/or from one or more virtual sensors configured to estimate the acoustic sound at one or more of the plurality of predefined environment locations 205, e.g., as described in detail below.

In some demonstrative embodiments, controller 120 may be configured to determine the sound control pattern 123, for example, based on the audio input 117 to be provided to the sound control zone 220, the environment acoustic information 111 and/or the plurality of monitoring inputs 113, and to output the sound control pattern 123 to control the plurality of acoustic transducers 108, e.g., as described in detail below.

In some demonstrative embodiments, the plurality of acoustic transducers 108, e.g., a plurality of speakers, may include, for example, a speaker array, e.g., as described below.

In some demonstrative embodiments, controller 120 may control the plurality of acoustic transducers 108 to generate, for example, based on sound control pattern 123, an audio output pattern 122 configured to control the audio within personal sound zone 220, e.g., as described below.

In one example, the plurality of accosting transducers 108 may include a plurality of speakers, loudspeakers or any other acoustic transducers configured to focus audio output pattern 122, e.g., based on a multitude of the audio inputs 117, for example, into the one or more personal sound zones 201, for example, such that each personal sound zone 220 may experience the respective audio input, e.g., as described below.

In some demonstrative embodiments, the plurality of accosting transducers 108 may include an array of loudspeakers deployed in environment 215, e.g., including the personal sound zone 220, e.g., as described below.

In some demonstrative embodiments, the plurality of acoustic transducers 108 may include, for example, an array of one or more acoustic transducers, e.g., at least one suitable speaker, to produce the audio output pattern 122, for example, based on sound control pattern 123.

In some demonstrative embodiments, the plurality of acoustic transducers 108 may be positioned at one or more locations, which may be determined based on one or more attributes of personal sound zone 220, e.g., a size and/or shape of zone 220, an expected location and/or directionality of personal sound zone 220, one or more attributes of the audio input 117 to be heard in the personal sound zone 220, a number of the plurality of acoustic transducers 108, and/or the like.

In one example, the plurality of acoustic transducers 108 may include a speaker array including a predefined number, denoted M, of speakers or a multichannel acoustical source.

In some demonstrative embodiments, the plurality of acoustic transducers 108 may include an array of speakers implemented using a suitable "compact acoustical source" positioned at a suitable location, e.g., external to personal sound zone 220. In another example, the array of speakers may be implemented using a plurality of speakers distributed in space, e.g., around personal sound zone 220.

In some demonstrative embodiments the plurality of environment locations 205 may be distributed externally to personal sound zone 220. For example, one or more of the plurality of environment locations 205 may be distributed on, or in proximity to, an envelope or enclosure surrounding personal sound zone 220.

For example, if personal sound zone 220 is defined by a spherical volume, then one or more of the plurality of environment locations 205 may be distributed on a surface of the spherical volume and/or external to the spherical volume.

In another example, one or more of the plurality of environment locations 205 may be distributed in any combination of locations on and/or external to the personal sound zone 220, e.g., one or more locations surrounding the spherical volume.

In some demonstrative embodiments, monitoring sensing locations 207 may be distributed within personal sound zone 220, for example, in proximity to the envelope of personal sound zone 220 and/or at any other locations within personal sound zone 220.

For example, if zone 220 is defined by a spherical volume, then monitoring sensing locations 207 may be distributed on a spherical surface having a radius, which is lesser than a radius of personal sound zone 220.

In some demonstrative embodiments, the plurality of acoustic sensors 110 may be configured and/or distributed to sense the acoustic sound at one or more of the plurality of environment locations 205.

In some demonstrative embodiments, the plurality of acoustic sensors 110 may be configured to listen to the environment and/or to provide reference signals, e.g., the environment acoustic information 111, based on sound sensed on the environment 215, e.g., as described below.

In some demonstrative embodiments, controller 120 may be configured to control "wanted" sound within at least one personal sound zone, e.g., the sound input 117 to be provided to personal sound zone 220, for example, by selectively controlling the wanted sound in one or more frequencies, e.g., only in the hearable frequencies related to the wanted sound, e.g., as described below.

For example, the selective control of the wanted sound in the one or more frequencies, e.g., only in the hearable frequencies related to the wanted sound, may provide a technical advantage of increasing, e.g., maximizing, the controller sound performance of controller 120.

In some demonstrative embodiments, controller 120 may be configured to utilize the environment acoustic information 111, for example, to estimate an acoustic energy, e.g., an unwanted acoustic energy, in the one or more hearable frequencies at the plurality of environment locations 205. For example, controller 120 may be configured to determine the sound control pattern 123 for the personal sound zone 220, while utilizing the estimated environment unwanted acoustical energy, which may mask, e.g., at monitoring locations 205, the sound to be heard in personal sound zone 220, e.g., audio input 117.

In one example, controller 120 may be configured to utilize the environment acoustic information 111, for example, to estimate the hearable frequencies within the at least one personal sound zone 220, related to the environment unwanted acoustical energy which mask the sound desired to be heard in the private sound zone 220.

In some demonstrative embodiments, controller 120 may be configured to spectrally estimate an environment noise and its contribution to a personal sound zone 220, for example, based on environment acoustic information 111.

In some demonstrative embodiments, controller 120 may be configured to control sounds within the personal sound zone 220, for example, based on relevant "dominant" audio frequencies relative to the environment noise sources. For example, using only the dominant audio frequencies, e.g., not all the frequency spectrum, may provide a technical solution supporting a reduced complexity, e.g., a reduced computational complexity, a reduced processing complexity, a reduced processing delay, and/or reduced power consumption, of system 100.

In some demonstrative embodiments, controller 120 may be configured to implement and/or support performing spectral analysis to the incoming audio streaming 117, for example, to optimize a solution, using constrains in the relevant dominant frequencies, and/or optimizing the solution complexity, by deciding which frequencies to solve.

In one example, controller 120 may be configured to implement the spectral analysis, for example, for different sound types of an audio input, e.g., speech, music, alerts, and/or the like.

In another example, controller 120 may be configured to implement the spectral analysis, for example, for multiple sound bubbles.

In some demonstrative embodiments, the plurality of monitoring sensors 112 may be configured to sense the acoustic sound at one or more of monitoring sensing locations 207.

In one example, the plurality of monitoring sensors 112 may be configured to sense and/or monitor an effectiveness of the acoustic sound at the plurality of predefined monitoring sensing locations 207.

In some demonstrative embodiments, the plurality of monitoring sensors 112 may be configured to generate the plurality of monitoring inputs 113 representing the acoustic sound at the plurality of predefined monitoring sensing locations 207 within the personal sound zone 220, e.g., as described below.

In some demonstrative embodiments, the plurality of monitoring sensors 112 may be configured to generate monitoring signals, e.g., the plurality of monitoring inputs 113, and/or may be located in the personal sound zone 220.

In one example, the plurality of monitoring sensors 112 may be used to monitor, e.g., in real time, an effectiveness of audio in the personal sound zone 220, to define a dimension of the personal sound zone 220 and/or to continuously optimize, e.g., in real time, the performance of the audio in the personal sound zone 220.

In some demonstrative embodiments, controller 120 may be configured to adjust and/or optimize, e.g., in real time, transfer functions, e.g., transfer functions from the plurality of transducers 108 to the one or more personal sound zones 220, for example, to accommodate for changes in the system and/or environment, for example, if a user changes an acoustical environment effect, e.g., as described below.

In some demonstrative embodiments, controller 120 may be configured to use the monitoring inputs 113 and/or the environment acoustic information 111, for example, to optimize one or more of the transfer functions, e.g., as described below.

In some demonstrative embodiments, controller 120 may optimize one or more of the transfer functions, for example, based on a Virtual Sensing methodology, e.g., as described below.

In some demonstrative embodiments, controller 120 may adjust and/or optimize one or more of the transfer functions, for example, based on one or more scenarios, which may cause an acoustical environment effect and/or change, e.g., as described below.

For example, controller 120 may adjust optimize one or more of the transfer functions, for example, based on movement of people, movement of objects, a temperature change and/or any other environmental and/or physical changes in environment 215.

For example, controller 120 may adjust and/or optimize one or more of the transfer functions, for example, based on a change in the location of a personal sound zone 220. For example, a personal sound zone 220 may be moved and/or changed. In one example, when system 100 is implemented within a vehicle, a personal sound zone for the driver may be moved based on movement of the driver and/or the seat of the driver.

In one example, the plurality of monitoring sensors 112 and/or the plurality of acoustic sensors 110 may include and/or may be implemented by one or more electronic sources, acoustic sources, electronic signals and/or sensors, for example, microphones, accelerometers, optical sensors, e.g., a laser sensor, a lidar sensor, a camera, a radar, digital audio signals and/or any other sensor.

In some demonstrative embodiments, one or more of the plurality of acoustic sensors 110 and/or one or more of the plurality of monitoring sensors 112 be implemented using one or more "virtual sensors" ("virtual microphones"). A virtual microphone corresponding to a particular microphone location may be implemented by any suitable algorithm and/or method capable of evaluating an acoustic pattern, which would have be sensed by an actual acoustic sensor located at the particular microphone location.

In some demonstrative embodiments, controller 120 may be configured to simulate and/or perform the functionality of the virtual microphone, e.g., by estimating and/or evaluating the acoustic audio pattern at the particular location of the virtual microphone.

In some demonstrative embodiments, system 100 may include a first array of one or more of the plurality of acoustic sensors 110, e.g., microphones, accelerometers, tachometers and the like, configured to sense the acoustic sound at one or more of the plurality of environment locations 205. For example, the plurality of acoustic sensors 110 may include one or more sensors to sense acoustic sound in a zone outside personal sound zone 220.

In some demonstrative embodiments, one or more of the sensors of the first array may be implemented using one or more "virtual sensors". For example, the first array may be implemented by a combination of at least one microphone and at least one virtual microphone. A virtual microphone corresponding to a particular microphone location of the plurality of environment locations 205 may be implemented by any suitable algorithm and/or method, e.g., as part of controller 120 or any other element of system 100, capable of evaluating an acoustic pattern, which would have be sensed by an acoustic sensor located at the particular microphone location. For example, controller 120 may be configured to evaluate the acoustic pattern of the virtual microphone based on at least one actual acoustic pattern sensed by the at least one microphone of the first array.

In some demonstrative embodiments, system 100 may include a second array of one or more of the plurality of monitoring sensors 112, e.g., microphones, configured to sense the acoustic sound at one or more of monitoring sensing locations 207. For example, the plurality of monitoring sensors 112 may include one or more sensors to sense the acoustic sound patterns in a zone within personal sound zone 220.

In some demonstrative embodiments, one or more of the sensors of the second array may be implemented using one or more "virtual sensors". For example, the second array may include a combination of at least one microphone and at least one virtual microphone. A virtual microphone corresponding to a particular microphone location of monitoring sensing locations 207 may be implemented by any suitable algorithm and/or method, e.g., as part of controller 120 or any other element of system 100, capable of evaluating an acoustic pattern, which would have be sensed by an acoustic sensor located at the particular microphone location. For example, controller 120 may be configured to evaluate the acoustic pattern of the virtual microphone based on at least one actual acoustic pattern sensed by the at least one microphone of the second array.

In some demonstrative embodiments, the number, location and/or distribution of the environment locations 205 and/or monitoring sensing locations 207, and/or the number, location and/or distribution of one or more acoustic sensors at one or more of environment locations 205 and/or monitoring sensing locations 207 may be determined based on a size of personal sound zone 220 or of an envelope of personal sound zone 220, a shape of personal sound zone 220 or of the envelope of personal sound zone 220, one or more attributes of the acoustic sensors to be located at one or more of the environment locations 205 and/or monitoring sensing locations 207, e.g., a sampling rate of the sensors, and the like.

In one example, one or more acoustic sensors, e.g., microphones, accelerometers, tachometers and the like, may be deployed at environment locations 205 and/or or monitoring sensing locations 207 according to the Spatial Sampling Theorem, e.g., as defined below by Equation 1.

For example, a number of the plurality of acoustic sensors 110, a distance between the plurality of acoustic sensors 110, a number of the monitoring sensors 112 and/or a distance between the monitoring sensors 112 may be determined in accordance with the Spatial Sampling Theorem, e.g., as defined below by Equation 1.

In one example, the plurality of acoustic sensors 110 and/or the plurality of monitoring sensors 112 may be distributed, e.g., equally distributed, with a distance, denoted d, from one another. For example, the distance d may be determined as follows:

$$d \le \frac{c}{2 \cdot f} \quad (1)$$

wherein c denotes the speed of sound and $f_{max}$ denotes a maximal frequency at which audio control is desired.

For example, in case the maximal frequency of interest is $f_{max}$=100 [Hz], the distance d may be determined as $$d \le \frac{343}{2 \cdot 100} = 1.71 [m].$$

In other embodiments, any other distances and/or deployment schemes may be used.

In some demonstrative embodiments, as shown in FIG. 2, deployment scheme 200 may be configured with respect to a circular or spherical personal sound zone 220. For example, the plurality of environment locations 205 may be distributed, e.g., substantially evenly distributed, in a spherical or circular manner around and outside of personal sound zone 220, and/or monitoring sensing locations 207 may distributed, e.g., substantially evenly distributed, in a spherical or circular manner within personal sound zone 220.

However in other embodiments, components of system 100 may be deployed according to any other deployment scheme including any suitable distribution of environment locations 205 and/or monitoring sensing locations 207, e.g., configured with respect a personal sound zone of any other suitable form and/or shape.

In some demonstrative embodiments, for example, the plurality of monitoring sensors 112 and/or acoustic sensors 110 may be located, for example, using virtual sensing techniques, for example, to locate monitoring sensors 112 and/or acoustic sensors 110 in feasible locations, e.g., in a headrest, above an occupied seat in a car and the like, while enabling a personal sound zone 220 for a user 202, for example, without a need to locate microphones in human ears of the user and/or surrounding a head of the user.

In one example, a virtual sensor, e.g., a virtual microphone, signal, denoted $\hat{e}_l^V[n]$, may be determined based on a sum of a desired virtual sensor, denoted $d_l^V[n]$, and a virtual audio signal estimation, denoted $\hat{CN}_l^V[n]$, e.g., as follows:

$$\hat{e}_l^V[n] = d_l^V[n] + \hat{CN}_l^V[n] \tag{2}$$

For example, a virtual sensing transfer function, denoted $\{h_{j,l}\}$, may be defined to fulfill the following requirement:

$$d_l^V[n] \cong \sum_{j=1}^{M_P} h_{j,l}[n] * d_j^P[n] \tag{3}$$

For example, the virtual sensing transfer function $\{h_{j,l}\}$ may be designed to map a physical desired signal, denoted $d_{1,L\,N_P}^P[n]$ to a virtual desired signal, denoted $d_{1,L\,M_V}^V[n]$.

For example, the virtual mic signal may be determined, e.g., as follows:

$$\hat{e}_l^V[n] = d_l^V[n] + \hat{CN}_l^V[N] \cong \sum_{j=1}^{M_P} h_{j,l}[n] * d_j^P[n] + \hat{CN}_l^V[n] \tag{4}$$

In some demonstrative embodiments, controller 120 may be configured to control an acoustic contrast of sound within the personal sound zone 220, e.g., as described below.

In some demonstrative embodiments, controller 120 may be configured to create an acoustic contrast between the personal sound zone 220 and surroundings of the personal sound zone 220, e.g., as described below.

In one example, the acoustic contrast may be between an audio input for the personal sound zone 220, e.g., audio input 117, and one or more other audio inputs for other personal sound zone, and/or between a subset of a plurality of audio inputs to a complementary subset of the plurality of audio inputs.

In some demonstrative embodiments, controller 120 may be configured to utilize the environment acoustic information 111, for example, to increase, e.g., maximize, the acoustic contrast between the personal sound zone 220 and surroundings of the personal sound zone 220, for example, with reduced, e.g., minimal, effect on an audio quality, e.g., in the personal sound zone 220, in the environment 215, and/or at one or more other personal sound zones.

In one example, the environment acoustic information 111 may serve as reference signals to the controller 120. According to this example, the controller 120 may use environmental prior acoustical knowledge, for example, to modify in the audio output pattern 122 one or more relevant frequencies, which may be designated to be heard by a user at the personal sound zone 220.

In some demonstrative embodiments, controller 120 may be configured to receive the environment acoustic information 111 and/or the plurality of monitoring inputs 113, and, for example, based on an acoustic contrast for the personal sound zone 220, to output the sound control signal 122 to the plurality of acoustic transducers 108, e.g., as described below.

In one example, the environment acoustic information 111 and/or the plurality of monitoring inputs 113 may be delayed by a configurable delay time by controller 120, for example, to allow sufficient time for transmission and processing of the sound control signal 123. For example, the delay time may be based, for example, on a nature of one or more of the inputs to controller 120.

In some demonstrative embodiments, controller 120 may be configured to implement and/or support an optimization method, for example, to improve a quality of the audio output pattern 122, e.g., the audio stream transmitted to the personal sound zone 220, for example, based on the environment acoustic information 111, which may represent environment noises and/or may enable control of the audio in the personal sound zone 220, for example, in real-time.

In one example, controller 120 may be configured to utilize the environment acoustic information 111 to consider one or more frequencies, e.g., only frequencies heard by the listener at specific time, and/or any other frequencies.

In some demonstrative embodiments, controller 120 may be configured to implement an optimization method to provide reduced, e.g., minimal, influence to the audio quality, for example, while providing a personal sound experience, for example, without disturbing other users, which are not located in the PSB 220.

In some demonstrative embodiments, controller may be configured to utilize the environment acoustic information 111 and/or the plurality of monitoring inputs 113, for example, to improve audio at the personal sound zone 220, for example, with reduced, e.g., minimal, disturbance to other zones, which are located outside the personal sound zone 220, e.g., which may be defined by the plurality of monitoring sensors 112.

In some demonstrative embodiments, controller 120 may be configured to modify sound control pattern 123 sent to audio transducers 108, for example, based on the environment acoustic information 111, for example, to achieve a local sound bubble, e.g., a PSB 220, with reduced, e.g., minimal, effect on a surrounding sound, e.g., at environment 215.

In some demonstrative embodiments, controller 120 may be configured to support an optimization method, for example, to enable a personal sound experience, e.g., at the personal sound zone 220, for example, even without disturbing others who are not located in the personal sound zone 220.

In some demonstrative embodiments, controller 120 may be configured to individually or jointly control a plurality of audio inputs for a plurality of personal sound zones, for example, by performing one or more operations described above for one personal sound zone, e.g., personal sound zone 220, for each zone of the plurality of personal sound zones, e.g., as described below.

In one example, a sound control signal, denoted "audio signal", of the plurality of sound controls signals of the sound control pattern 123 e.g., for an acoustic transducer 108, may be determined, for example, based on an audio input 117 designated to be heard in the personal sound zone 220, inputs from acoustic sensors 110, inputs from monitoring sensors 112, and/or based on other audio signals which are not required in the personal sound zone 220.

For example, the sound control signal may be determined based on the one or more audio inputs 117, the environment acoustic information 111 and/or the plurality of monitoring inputs 113, e.g., as follows:

$$\text{Sound control signal'} = f(\text{environment mics}(n), \text{monitoring mics}(n), \text{Audio signal}^{t-P}(n)) \tag{5}$$

In some demonstrative embodiments, a PSB system, e.g., system 100, may be combined with one or more other systems, for example, to improve the audio quality at the personal sound zone 220.

In some demonstrative embodiments, the PSB system 100 may be combined with, and/or may implement, an Active Noise Control/Cancelation (ANC) system, which may be configured for example, to reduce or eliminate undesirable noise, e.g., at the personal sound zone 220, e.g., as described below.

In one example, controller 120 may be configured to utilize a combination of the personal sound control techniques described herein together with ANC techniques, for example, to control sound in PSB 220 based on a combination of the audio input 117 and ANC of one or more unwanted noise signals, e.g., as described below. According to this example, performance of a PSB system may be improved, for example, by using ANC to reduce leftover undesired sounds in the PSB, for example, originating from other PSBs and/or other noise sources. For example, audio streams for PSB 220 may be used as inputs of an ANC system, for example, as reference inputs, for example, to reduce the effect of these audio streams, for example, in zones were those streams are not wanted, e.g., as described below.

In one example, controller 120 may be configured to determine sound control pattern 123 for Q sound zones 210, e.g., including personal sound zones 220 and 229.

In some demonstrative embodiments, a predefined number of monitoring sensors, denoted Lq be placed within a sound zone q.

In some demonstrative embodiments, a total of the monitoring sensors may include a sum of the monitoring sensors Lq in all the personal sound zones Q, e.g., $\Sigma_{q=1}^{Q} L_q$.

In some demonstrative embodiments, a vector, denoted $P_q$, of sound pressures corresponding to the microphone sensing locations in a zone q at a particular frequency, denoted w, may be defined, e.g., as follows:

$$p_q \triangleq [p_q(1,w), \ldots, p_q(L_q,w)]^T \qquad (6)$$

In some demonstrative embodiments, the vector $P_q$ of sound pressure at the zone q may be defined based on a product of a set of weight vectors, denoted $g_q$, with a transfer function, denoted $H_q$, between a plurality of acoustic transducers M, e.g., the plurality of acoustic transducers 108, and the personal sound zone q, for example, between the plurality of acoustic transducers M and the monitoring sensors at the personal sound zone q, e.g., as follows:

$$p_q = H_q g_q \qquad (7)$$

In some demonstrative embodiments, the set of weight vectors $g_q$, may include a plurality of weight vectors corresponding to the plurality of acoustic transducers M at the particular frequency ω, for example, such that a weight vector $g_{qm}$ of the set of weight vectors $g_q$ may correspond to a respective m-th transducer of the plurality of transducers M, e.g., as follows:

$$g_q \triangleq [g_{q1}(w), \ldots, g_{qM}(w)]^T \qquad (8)$$

In one example, the set of weight vectors $g_q$, may be include a vector of loudspeaker driving signals at the given frequency w to create the personal sound zone q, for example, personal sound zone 220, and/or $H_q$ may represents a matrix of acoustic transfer functions between the loudspeaker drivers and the monitoring microphones in zone q.

In some demonstrative embodiments, controller 120 may be configured to maximize a contrast in an acoustic energy between a personal sound zone b in which the audio input is to be heard ("bright zone"), e.g., personal sound zone 220, and another zone d ("dark zone"), e.g., one or more other personal sound zones of the plurality of personal sound zones 201.

In one example, the personal sound zone q of the plurality of personal sound zones Q may be defined as the bright zone b, and the remaining Q–1 sound zones of the plurality of personal sound zones Q may be defined as the dark zones d.

In another example, the dark zones d may include one or more other zones or areas in the environment 215, e.g., inside or outsize zones 201.

In some demonstrative embodiments, an energy, denoted $E_b$, at the bright zone, may include acoustic energy at the personal sound zone q, which may be based on the set of weight vectors $g_q$ corresponding to the personal sound zone q, and based on acoustic transfer functions, denoted $H_b$, between the plurality of acoustic transducers M and the personal sound zone q, for example, at one or more monitoring locations inside the personal sound zone q, e.g., as follows:

$$E_b = \|p_b\|^2 = g_q^T H_b^T H_b g_q \qquad (9)$$

In some demonstrative embodiments, an energy, denoted $E_d$, at the dark zone may include acoustic energy at the remaining Q–1 sound zones, which may be based on the set of weight vectors $g_q$ corresponding to the personal sound zone q and based on acoustic transfer functions, denoted $H_d$, between the plurality of acoustic transducers M and the remaining Q–1 sound zones, for example, at one or more monitoring locations outside the personal sound zone q, e.g., as follows:

$$E_d = \|p_d\|^2 = g_q^T H_d^T H_d g_q \qquad (10)$$

In some demonstrative embodiments, controller 120 may be configured to determine the set of weight vectors $g_q$ corresponding to the personal sound zone q, for example, based on a criterion relating to a contrast between the first acoustic energy $E_b$, and the second acoustic energy $E_d$, e.g., as described below.

In some demonstrative embodiments, the criterion may include limiting acoustic energy $E_b$, for example, based on a volume, denoted $B_0$, at which the audio input is to be heard in the personal sound zone q, and/or minimizing the second energy $E_d$, for example, to maximize the contrast between the bright and dark zones, e.g., based on some or all of the following Criteria Set:

$$\min_g E_d$$

$$E_b = B_0$$

$$\|g_{qm}\|^2 \le E_m, m=1, \ldots, M \qquad (11)$$

wherein, the first criterion may require that the acoustic energy $E_d$ in the dark zone is to be at minimum, the second criterion may require that the acoustic energy $E_b$ in the bright zone, e.g., personal sound zone 220, may be controlled by the desired volume $B_0$, and/or the third criterion may apply energy constraints to a speaker m. e.g., some or all speakers, of the plurality of speakers M, for example, depending on type and/or specification of the speaker m.

In some demonstrative embodiments, a target function, denoted L(g), may be defined based on the Criteria Set (11), e.g., as follows:

$$L(g) = g_q^T H_d^T H_d g_q + \lambda_c \left( g_q^T H_b^T g_q - B_0 \right) + \sum_{m=1}^{M} \left( \|g_m(w)\|^2 - E_m \right) \qquad (12)$$

In some demonstrative embodiments, controller 120 may be configured to determine the set of weight vectors $g_q$, for example, by determining a maximal Eigen vector that minimizes the target function L(g), e.g., as follows:

$$\lambda_c g_q = [H_d^T H_d + \overline{\lambda}_M]^{-1} [H_b^T H_b] g_q \qquad (13)$$

In some demonstrative embodiments, the set of weight vectors $g_q$ may be determined for the particular personal sound zone q and for the particular frequency w, and may include a plurality of weight vectors corresponding to the plurality of acoustic transducers, e.g., from 1 to M.

In some demonstrative embodiments, controller 120 may be configured to determine a sound control signal, denoted $\tilde{A}_m(w)$, for a particular acoustic transducer m at the particular frequency ω, for example, by applying to an audio input, denoted $Audio_q(w)$, to be heard in the personal sound zone q, a weight vector corresponding to the particular acoustic transducer m from the set of weight vectors $g_q$, corresponding to the personal sound zone q, e.g., as follows:

$$\tilde{A}_m(w) = \sum_{q=1}^{Q} g_{qm}(w) \cdot Audio_q(w) \qquad (14)$$

wherein $\tilde{A}_m(w)$ may be defined as the frequency adjusted audio output of the speaker m, and may represent, for example, a sum of all audio output to each zone q of the Q zones at the frequency w, multiplied by the appropriate weight vector $g_{qm}(w)$.

In some demonstrative embodiments, controller 120 may be configured to convert the signal $\tilde{A}_m(w)$ from a frequency domain to a time domain, for example, before transmitting the signal to the speaker m. For example, controller 120 may apply an Inverse Fast Fourier Transfer (IFFT) to the sound control signal $\tilde{A}_m(w)$ for the particular acoustic transducer m at the particular frequency ω, e.g., as follows:

$$\text{output\_audio}_m = \text{ifft}(\tilde{A}_m) \qquad (15)$$

Figure 3:
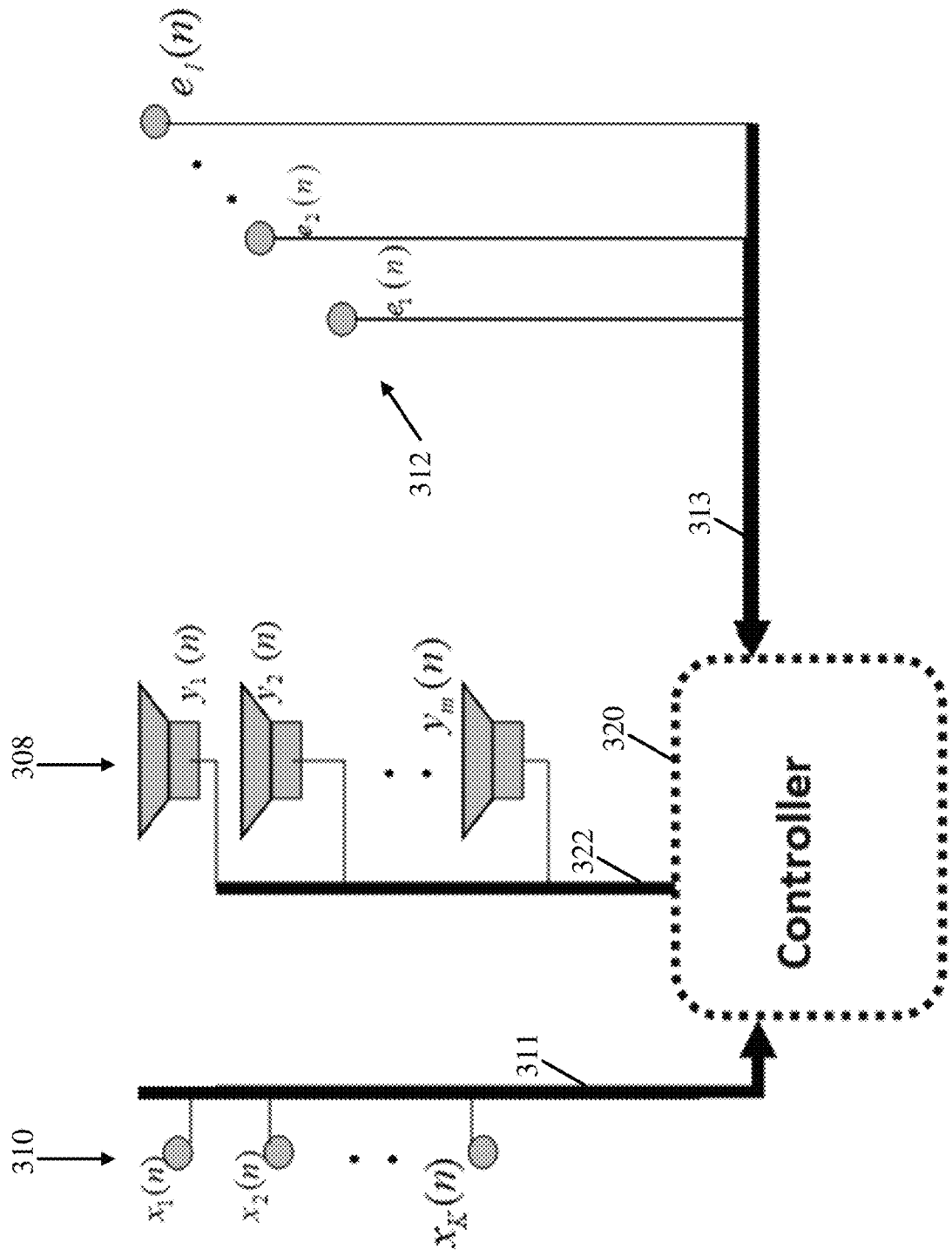
FIG. 3 is a schematic block diagram illustration of a controller, in accordance with some demonstrative embodiments.

Reference is now made to FIG. 3, which schematically illustrates a PSB controller 320, in accordance with some demonstrative embodiments.

In one example, controller 120 (FIG. 1) may perform one or more operations of, one or more functionalities of, and/or the role of, the PSB controller 320 (FIG. 3).

In some demonstrative embodiments, as shown in FIG. 3, PSB controller 320 may be implemented as a multi-input-multi-output (MIMO) PSB controller to receive a plurality of environment inputs 311 from a plurality of environment sensors 310.

In some demonstrative embodiments, as shown in FIG. 3, PSB controller 320 may receive a plurality of monitoring inputs 313 from a plurality of monitoring sensors 312.

In some demonstrative embodiments, as shown in FIG. 3, PSB controller 320 may output a sound control pattern 322 to a plurality of acoustic transducers 308.

Figure 4A:
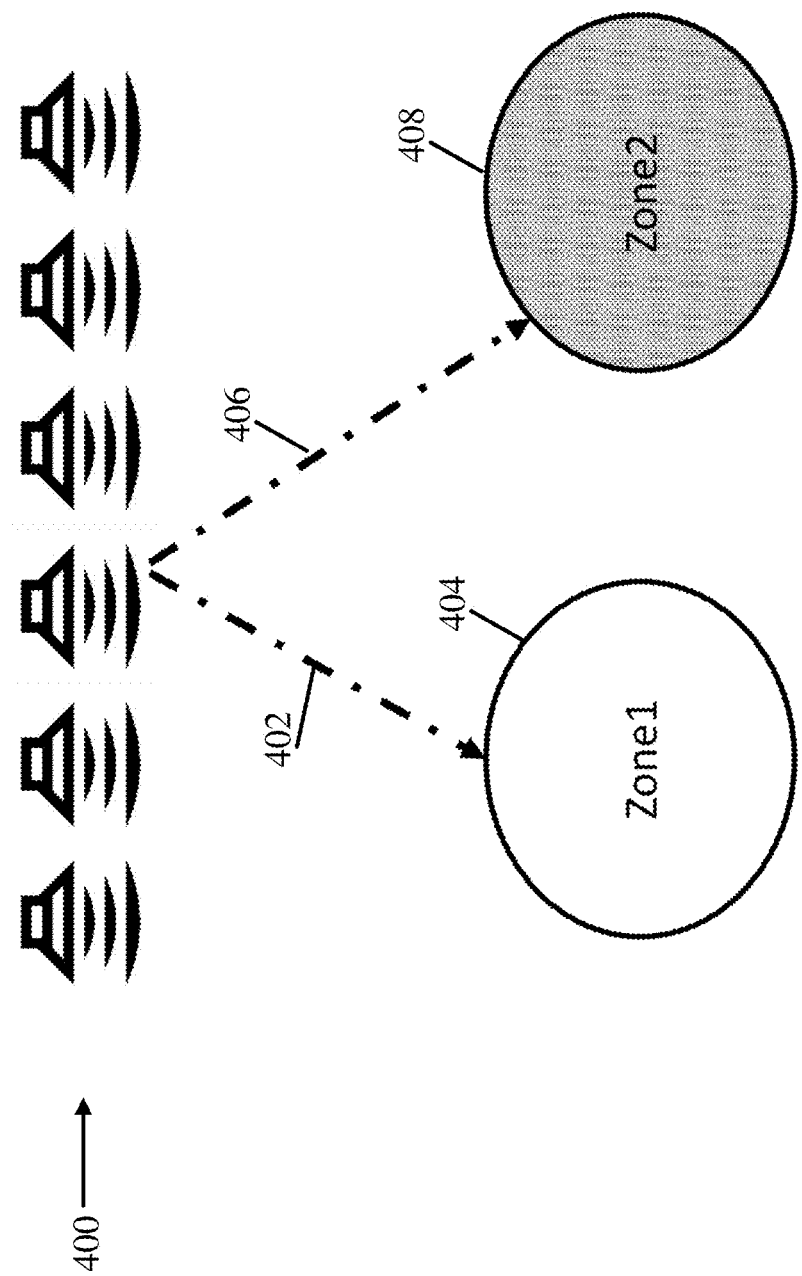
FIG. 4A is a schematic illustration of an array of loudspeakers deployed to control sound in a plurality of sound control zones, in accordance with some demonstrative embodiments.
Figure 4B:
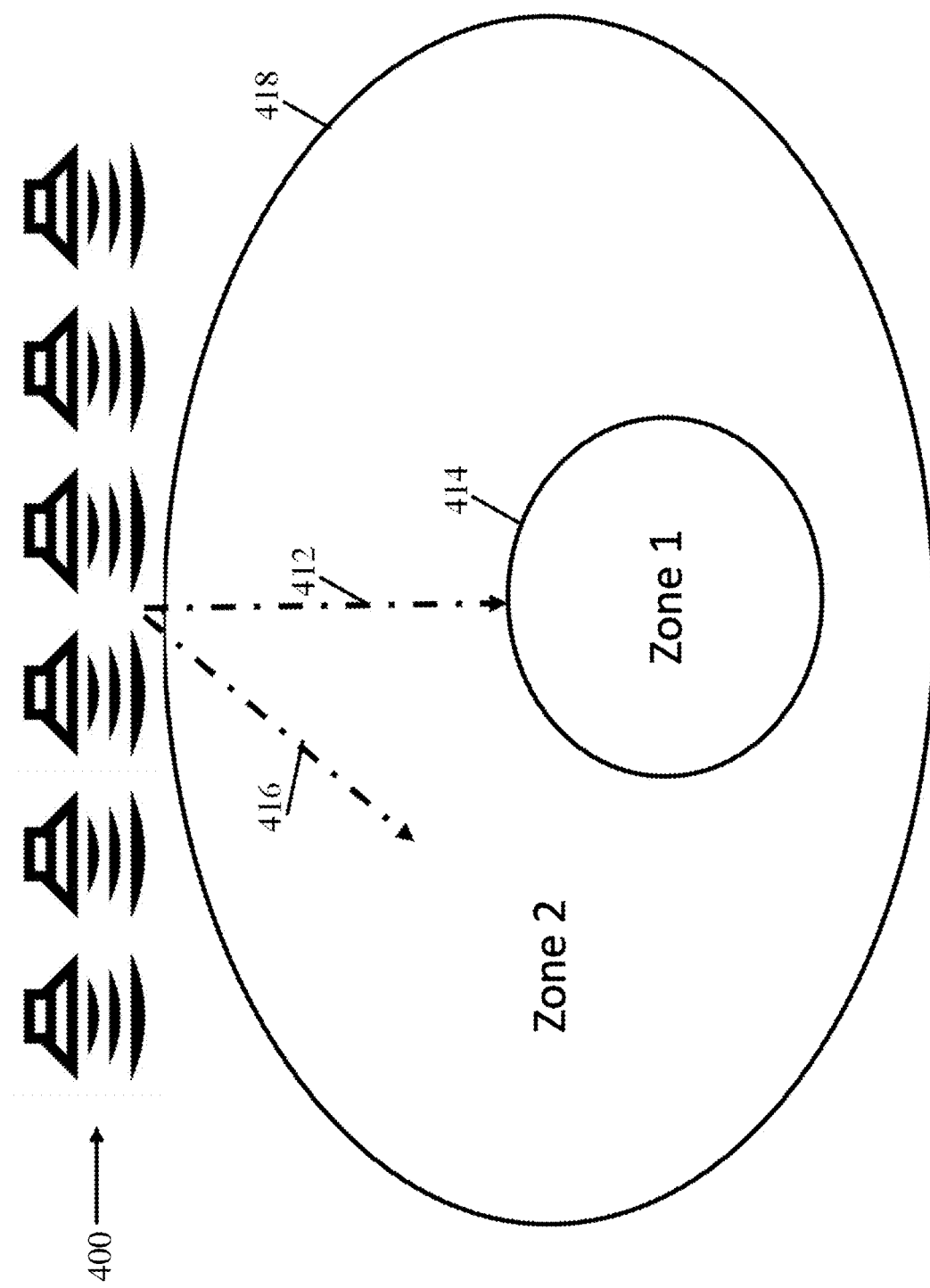
FIG. 4B is a schematic illustration of an array of loudspeakers deployed to control sound in a plurality of sound control zones, in accordance with some demonstrative embodiments.

Reference is made to FIGS. 4A and 4B, which schematically illustrate an array of loudspeakers 400 deployed to control sound in a plurality of sound control zones, in accordance with some demonstrative embodiments.

In some demonstrative embodiments, the array of loudspeakers 400 may be configured to focus two audio inputs, for example, to two respective personal sound zones, e.g., as described below.

For example, as shown in FIG. 4A, the array of loudspeakers 400 may include a plurality of loudspeakers, which may be configured to send a first sound transmission 402 towards a first personal sound zone 404, and a second sound transmission 406 towards a second personal sound zone 408, e.g., as described above.

For example, as shown in FIG. 4B, the plurality of loudspeakers of array 400 may be configured to send a first sound transmission 412 towards a first sound zone 414, e.g., a personal sound zone; and a second sound transmission 416 for a second sound zone 418, for example, in an environment surrounding the first sound zone 414, e.g., as described above.

In other embodiments, any other configuration of the first and second sound zones may be implemented, and/or any other number of a plurality of sound zones may be implemented.

Figure 5:
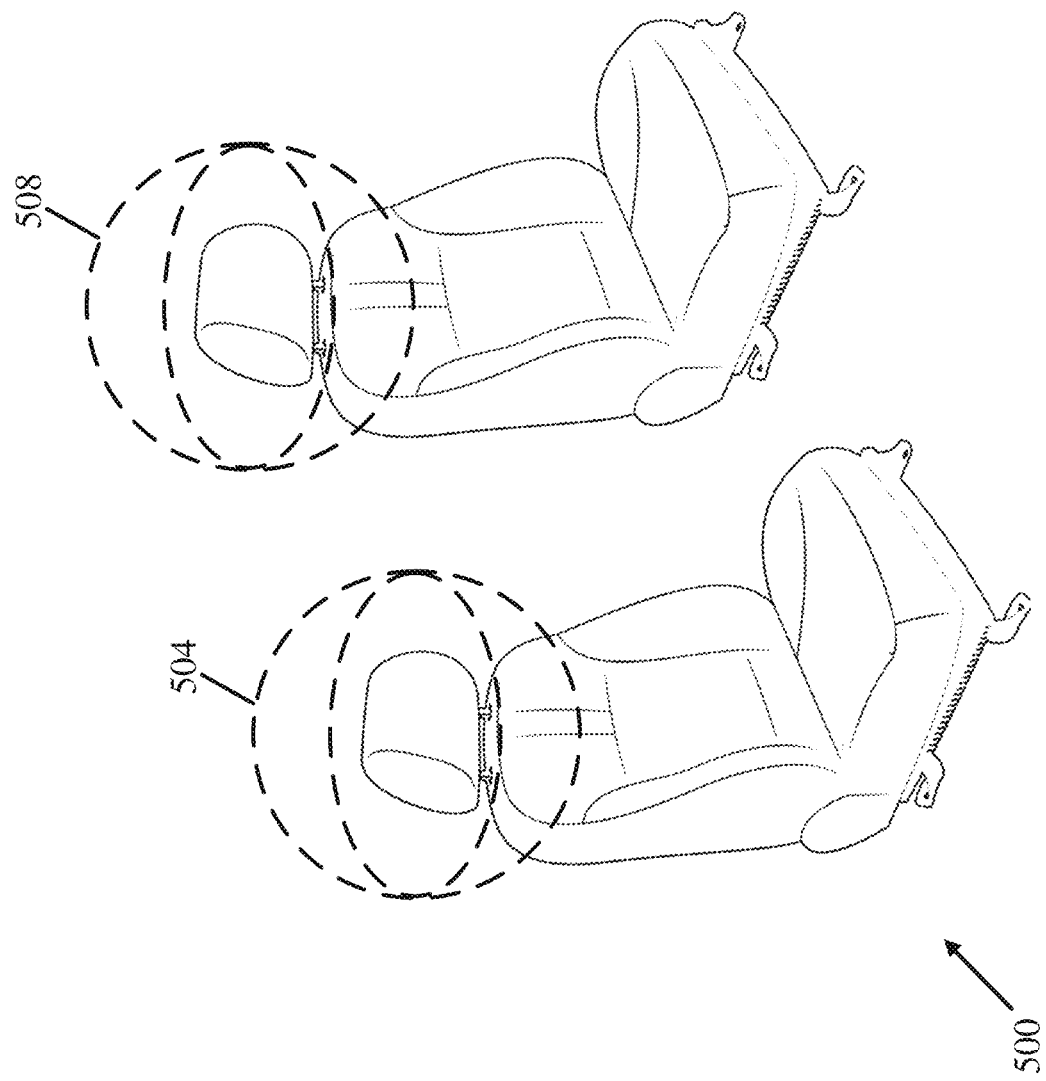
FIG. 5 is a schematic illustration of a deployment scheme of a sound control system, in accordance with some demonstrative embodiments.

Reference is made to FIG. 5, which schematically illustrates a deployment scheme 500 of a PSB system, in accordance with some demonstrative embodiments.

In some demonstrative embodiments, PSB system 100 (FIG. 1) may be implemented in an environment, for example, a car, and airplane or the like, e.g., which may be configured for two persons sitting in two seats, e.g., as described below.

In one example, deployment scheme 500 may implement the PSB system for two seats, for example, two front seats of a car, and/ort any other number of seats, e.g., in a row, and/or any other arrangement of seats.

In some demonstrative embodiments, as shown in FIG. 5, the PSB system may be configured to create at least one first PSB 502 around a head of a first user, e.g., two PSBs around two ears of the first user, and/or at least one second PSB 508 around a head of a second user e.g., two PSBs around two ears of the second user.

In one example, controller 120 (FIG. 1) may be configured to control the array of loudspeakers 400 (FIG. 4) to create PSBs 504 and/or 508.

In some demonstrative embodiments, a sound control system, e.g., PSB system 100 (FIG. 1), may be configured to implement and/or support various deployment schemes of one or more PSBs, e.g., as described below.

Figure 6:
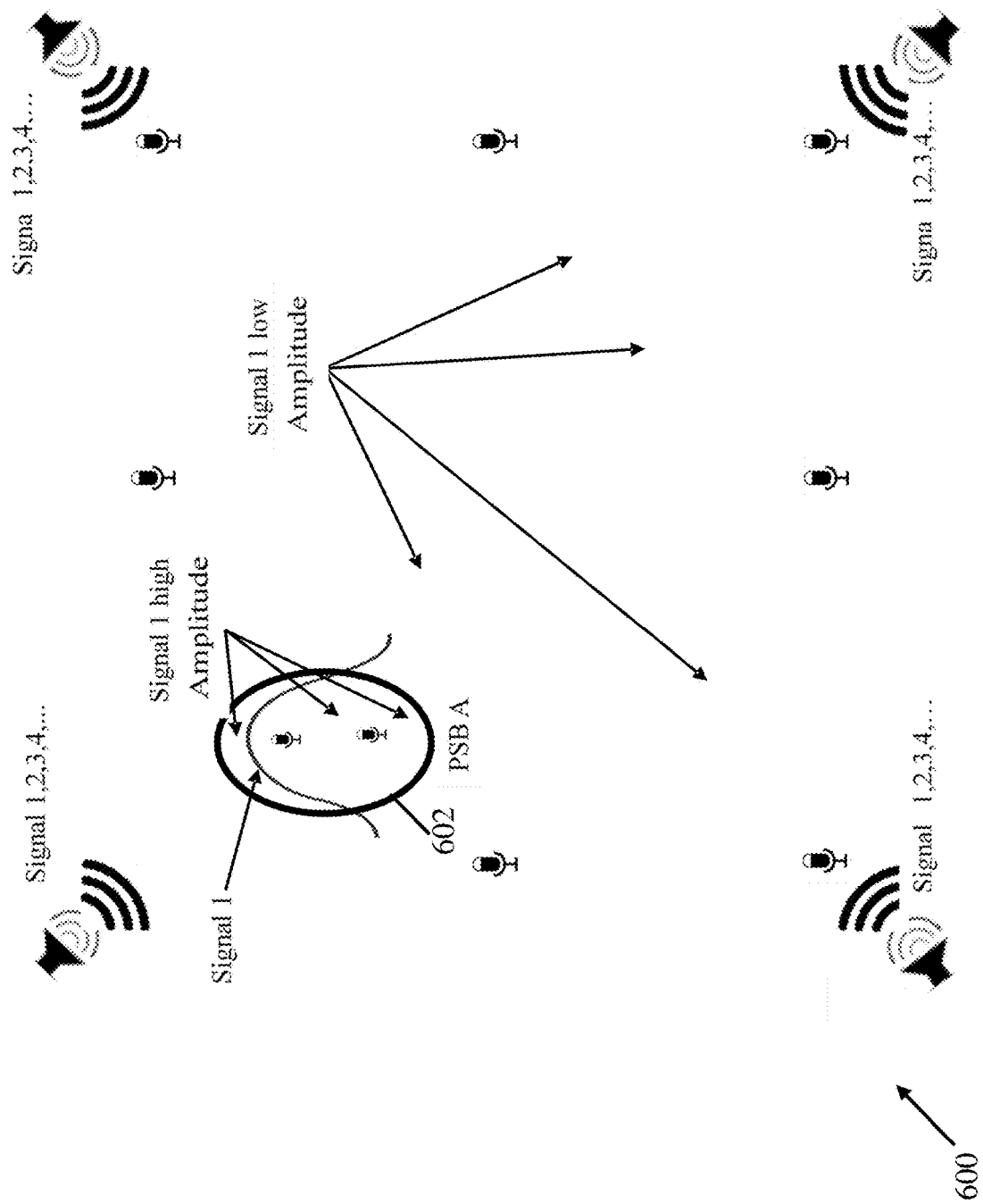
FIG. 6 is a schematic illustration of a deployment scheme of components of a sound control system, in accordance with some demonstrative embodiments.

Reference is made to FIG. 6, which schematically illustrates a deployment scheme of a PSB system 600, in accordance with some demonstrative embodiments. For example, noise control system 100 (FIG. 1) may perform one or more operations of, one or more functionalities of, and/or the role of PSB system 600.

In some demonstrative embodiments, PSB system 600 may be configured to create a PSB 602 for an audio signal, denoted "Signal 1", e.g., as described below.

In some demonstrative embodiments, PSB system 600 may create PSB 602, for example, by creating an acoustic contrast for the audio signal 1 between PSB 602 and one or more other areas, e.g., as described below.

In some demonstrative embodiments, PSB system 600 may be configured to create a high contrast between a first amplitude, e.g., a high amplitude, of the audio signal 1 inside a PSB 602, and a second amplitude, e.g., a low amplitude, of the audio signal 1 outside PSB 602.

Figure 7:
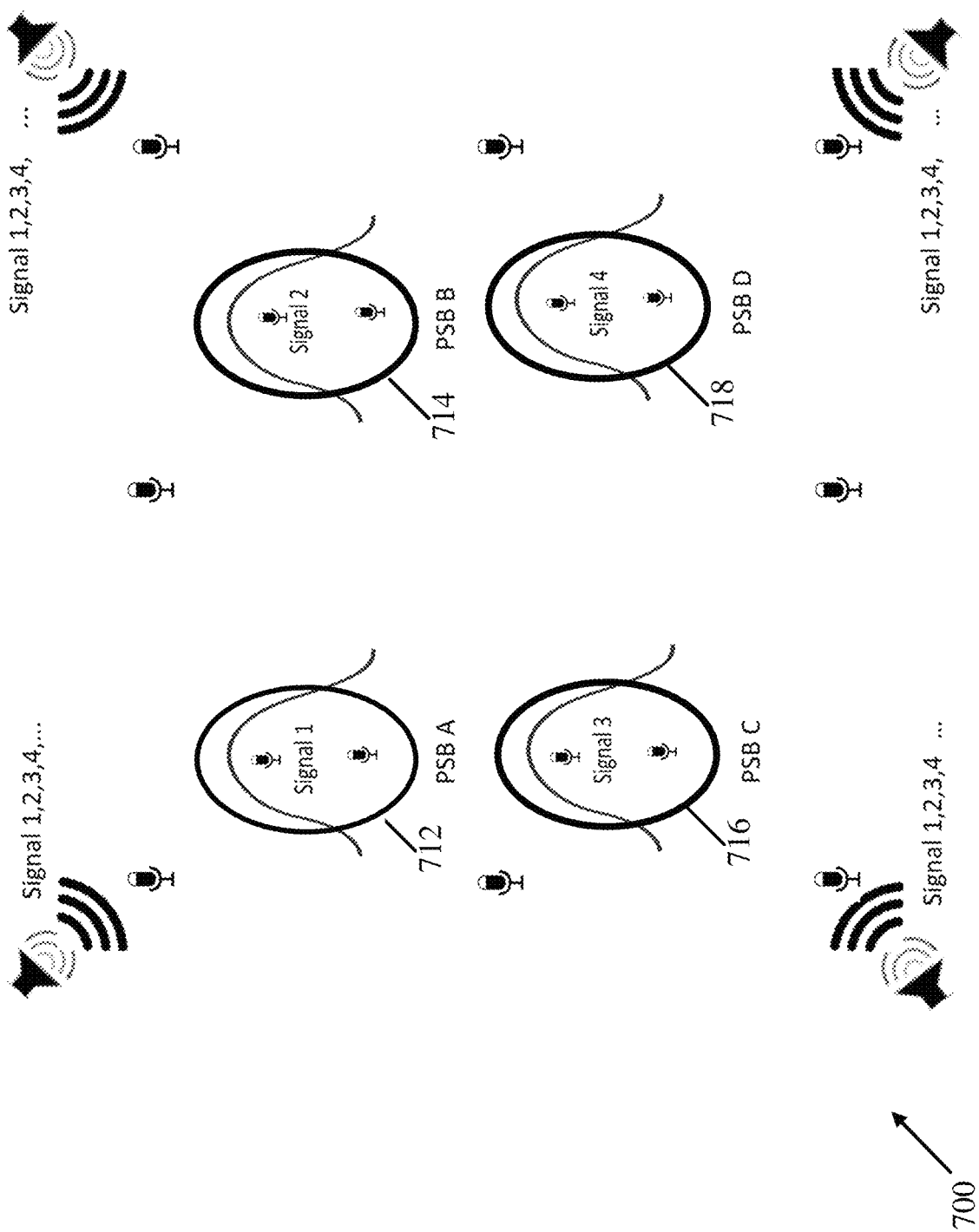
FIG. 7 is a schematic illustration of a deployment scheme of components of a sound control system, in accordance with some demonstrative embodiments.

Reference is made to FIG. 7, which schematically illustrates a deployment scheme of a PSB system 700, in accordance with some demonstrative embodiments. For example, noise control system 100 (FIG. 1) may perform one or more operations of, one or more functionalities of, the role of PSB system 700.

In some demonstrative embodiments, PSB system 700 may be configured to create a plurality of PSBs for a respective plurality of audio signals, denoted "Signals 1, 2, 3, 4, . . . ", e.g., as described below.

In one example, PSB system 700 may be implemented using multiple PSB systems. For example, PSB system 700 may include a plurality of PSB systems to process, e.g., individually and/or independently, the plurality of audio signals for a plurality of PSBs.

In another example, PSB system 700 may be implemented to jointly implement and/or control two or more PSBs of the plurality of PSBs.

In some demonstrative embodiments, PSB system 700 may be configured to create the plurality of PSBs, for example, by creating an acoustic contrast between the plurality of audio signals, as described below.

In some demonstrative embodiments, PSB system 700 may be configured to create for an audio signal, e.g., for each signal, of the plurality of audio signals, a high contrast between a first amplitude, e.g., a high amplitude, of the audio signal inside a respective PSB corresponding to the audio signal, and a second amplitude, e.g., a low amplitude, of the audio signal outside the respective PSB.

In one example, PSB system 700 may be configured to create the high contrast for each signal, for example, by repeating the operations of PSB system 600 (FIG. 6), e.g., for each signal of the plurality of audio signals.

For example, PSB system 700 may create a first PSB 712, denoted "PSB A", for a first audio signal, denoted "Signal 1", for example, by creating a high contrast between a first amplitude, e.g., a high amplitude, of the audio signal 1 inside PSB 712, and a second amplitude, e.g., a low amplitude, of the signal 1 outside PSB 712; a second PSB 714, denoted "PSB B", for a second audio signal, denoted "Signal 2", for example, by creating a high contrast between a high amplitude of the signal 2 inside PSB 714, and a low amplitude of the audio signal 2 outside PSB 714; a third PSB 716, denoted "PSB C", for a third audio signal, denoted "Signal 3", for example, by creating a high contrast between a high amplitude of the signal 3 inside PSB 716, and a low amplitude of the audio signal 3 outside PSB 716; and/or a fourth PSB 718, denoted "PSB D", for a fourth audio signal, denoted "Signal 4", for example, by creating a high contrast between a high amplitude of the signal 4 inside PSB 718, and a low amplitude of the signal 4 outside PSB 718.

Figure 8:
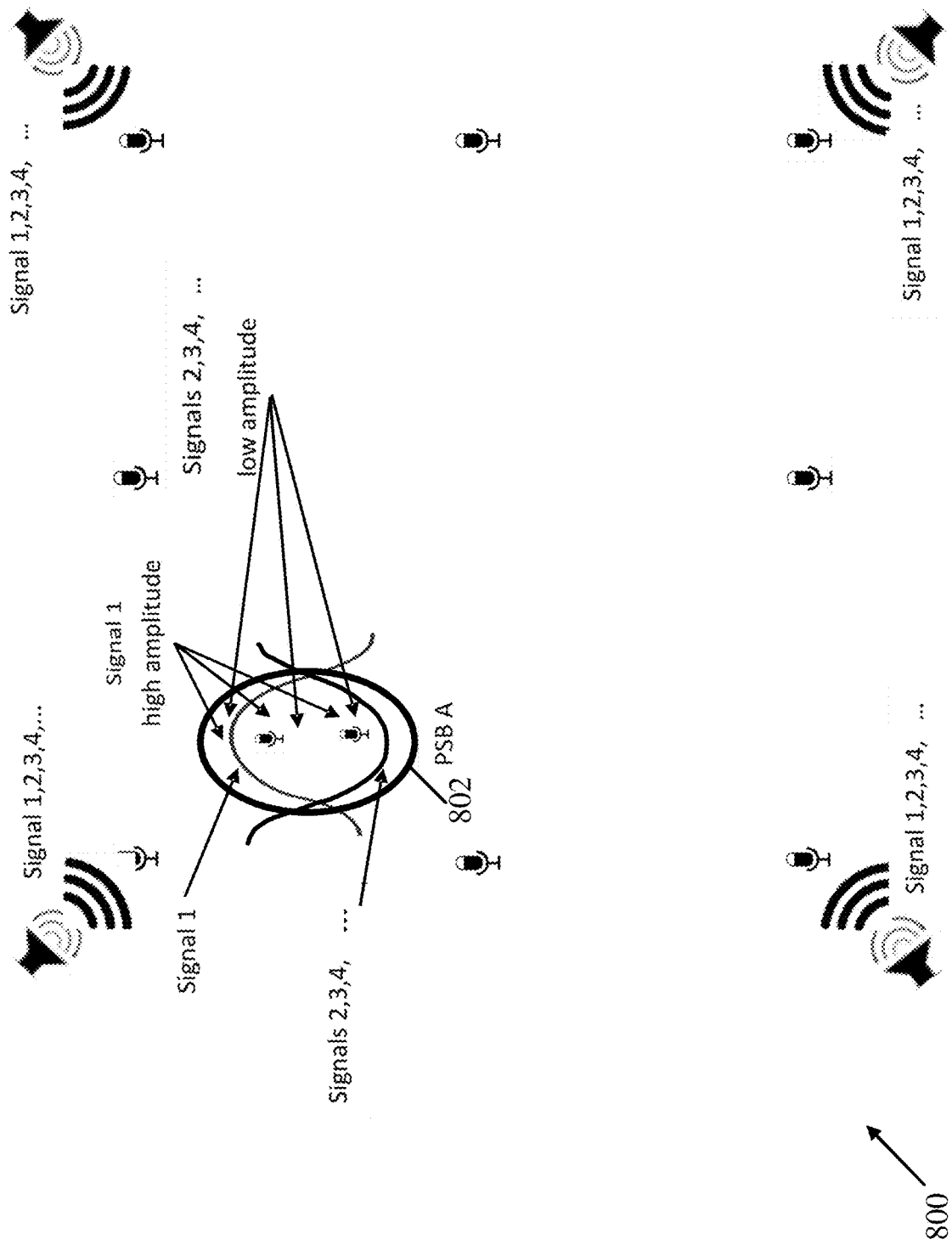
FIG. 8 is a schematic illustration of a deployment scheme of components of a sound control system, in accordance with some demonstrative embodiments.

Reference is made to FIG. 8, which schematically illustrates a deployment scheme of a PSB system 800, in accordance with some demonstrative embodiments. For example, noise control system 100 (FIG. 1) may perform one or more operations of, one or more functionalities of, and/or the role of PSB system 800.

In some demonstrative embodiments, PSB system 800 may be configured to create a PSB for an audio signal, denoted "Signal 1".

In some demonstrative embodiments, PSB system 800 may create the PSB for audio signal 1, for example, by creating an acoustic contrast between the audio signal 1 and a plurality of other (unwanted) audio signals, denoted "Signals 2, 3, 4, . . . ", e.g., as described below.

In some demonstrative embodiments, PSB system 800 may be configured to create a high contrast for the audio signal 1, for example, by creating inside PSB 802 a first amplitude, e.g., a high amplitude, of the signal 1, and creating inside PSB 802 a second amplitude, e.g., a low amplitude, of the plurality of other audio signals.

Figure 9:
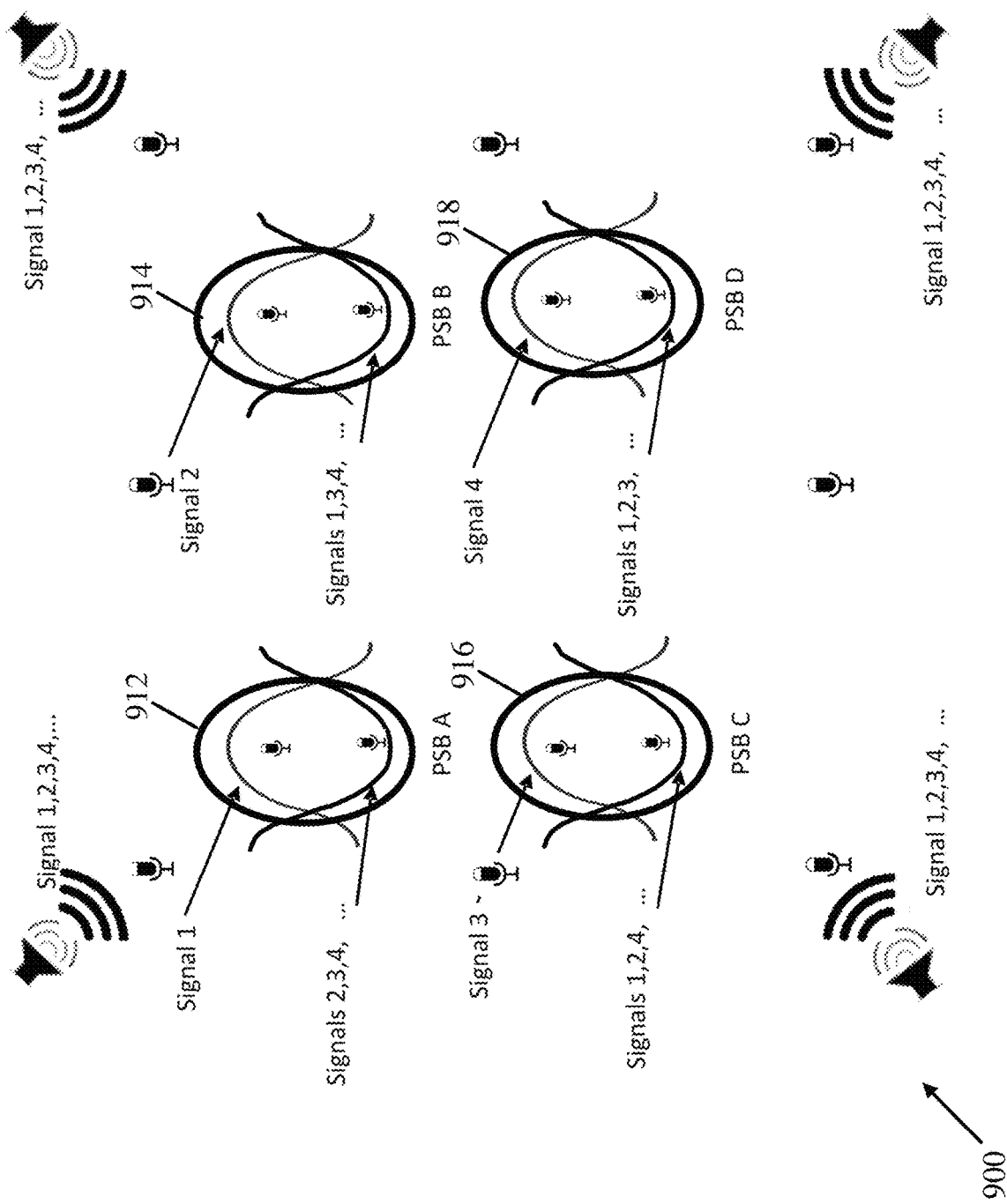
FIG. 9 is a schematic illustration of a deployment scheme of components of a sound control system, in accordance with some demonstrative embodiments.

Reference is made to FIG. 9, which schematically illustrates a deployment scheme of a PSB system 900, in accordance with some demonstrative embodiments. For example, sound control system 100 (FIG. 1) may perform one or more operations of, one or more functionalities of, and/or the role of PSB system 900.

In some demonstrative embodiments, PSB system 900 may be configured to create a plurality of PSBs for a respective plurality of input audio signals, e.g., as described below.

In one example, PSB system 900 may be implemented using multiple PSB systems. For example, PSB system 900 may include a plurality of PSB systems to process, e.g., individually and/or independently, the plurality of audio signals for a plurality of PSBs.

In another example, PSB system 900 may be implemented to jointly implement and/or control two or more PSBs of the plurality of PSBs.

In some demonstrative embodiments, PSB system 900 may be configured to create acoustic contrasts between the audio signals at the plurality of PSBs, e.g., as described below.

In some demonstrative embodiments, PSB system 900 may be configured to create a high contrast for an audio signal of a PSB, e.g., each PSB, of the plurality of PSBs, for example, by creating inside the PSB a first amplitude, e.g., a high amplitude, to the dedicated audio signal of the PSB, and creating inside the PSB a second amplitude, e.g., a low amplitude, to the remaining audio signals of the plurality of audio signals inside the PSB.

For example, PSB system 900 may create a first PSB 912, denoted "PSB A", for a first audio signal, denoted "Signal 1", for example, by creating inside PSB 912 a high contrast between a first amplitude, e.g., a high amplitude, of the audio signal 1, and a second amplitude, e.g., a low amplitude, of the signals 2, 3, and/or 4; a second PSB 914, denoted "PSB B", for a second audio signal, denoted "Signal 2", for example, by creating inside PSB 914 a high contrast between a high amplitude of the signal 2, and a low amplitude of the signals 1, 3 and/or 4; a third PSB 916, denoted "PSB C", for a third audio signal, denoted "Signal 3", for example, by creating inside PSB 916 a high contrast between a high amplitude of the signal 3 and a low amplitude of signals 1, 2, and/or 4; and/or a fourth PSB 918, denoted "PSB D", for a fourth audio signal, denoted "Signal 4", for example, by creating a high contrast between a high amplitude of the signal 4, and a low amplitude of signals 1, 2, and/or 3.

In one example, PSB system 900 may be configured to create the high contrast for each PSB, for example, by repeating the operations of PSB system 800 (FIG. 8), e.g., for each PSB of the plurality of PSBs.

Figure 10:
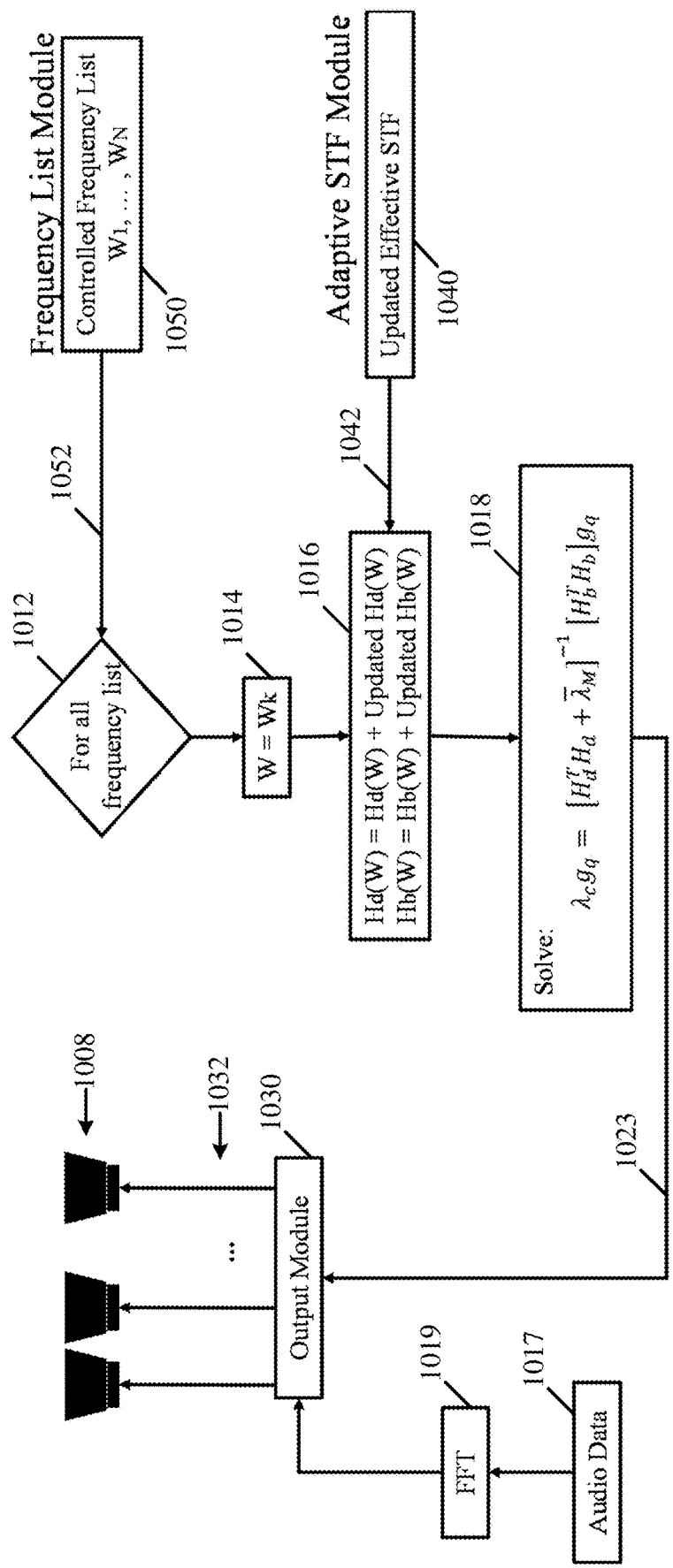
FIG. 10 is a schematic illustration of a controller, in accordance with some demonstrative embodiments.

Reference is made to FIG. 10, which schematically illustrates a controller 1020, in accordance with some demonstrative embodiments. For example, controller 120 (FIG. 1) may include, perform the role of, perform the functionality of, perform the role of, and/or perform one or more operations of controller 1020.

In some demonstrative embodiments, as shown in FIG. 10, controller 1020 may include a frequency selector 1050, e.g., implemented as a Frequency List Module, to output a plurality of selected frequencies 1052, e.g., as described below.

In some demonstrative embodiments, as shown in FIG. 10, controller 1020 may include a Speaker Transfer function (STF) adapter 1040, e.g., implemented as Adaptive STF Module, to output a plurality of acoustic transfer functions 1042, e.g., as described below.

In some demonstrative embodiments, as shown in FIG. 10, controller 1020 may include a sound control pattern generator 1030, e.g., implemented as an Output Module, to process a plurality of sets of weight vectors 1023, and to generate a sound control pattern including a plurality of sound control signals 1032 to a plurality of acoustic transducers 1008, e.g., as described below.

In some demonstrative embodiments, as shown in FIG. 10, the plurality of sound control signals 1032 may be based on weight vectors 1023, and an audio input 1017, e.g., after converting the audio input into a frequency domain, for example, by applying a Fast Fourier Transform (FFT) 119 to the audio input 1017.

In some demonstrative embodiments, as shown in FIG. 10, controller 1020 may determine the weight vectors 1023 based on the plurality of selected frequencies 1052 and the acoustic transfer functions 1042, e.g., as described below.

In some demonstrative embodiments, as indicated at block 1012 and 1014, controller 1020 may iterate over frequencies W the plurality of selected frequencies 1052, e.g., as described below.

In some demonstrative embodiments, as indicated at blocks 1016, controller 1020 may determine first transfer functions, denoted Hd(W), e.g., dark zone transfer functions, and/or second transfer functions, denoted Hb(W), e.g., bright zone transfer functions, for example, based on the plurality of acoustic transfer functions from STF adapter 1040, e.g., as described above.

In one example, the bright transfer functions may include acoustic transfer functions between the plurality of acoustic transducers 1008 and a personal sound zone q, and the dark acoustic transfer functions may include acoustic transfer functions between the plurality of acoustic transducers 1008 and one or more monitoring locations outside the personal sound zone q, e.g., as described above.

In some demonstrative embodiments, as indicated at block 1018, controller 1020 may determine a set of weight vectors corresponding to the personal sound zone q, for example, based on Equation 13, e.g., as described above.

Figure 11:
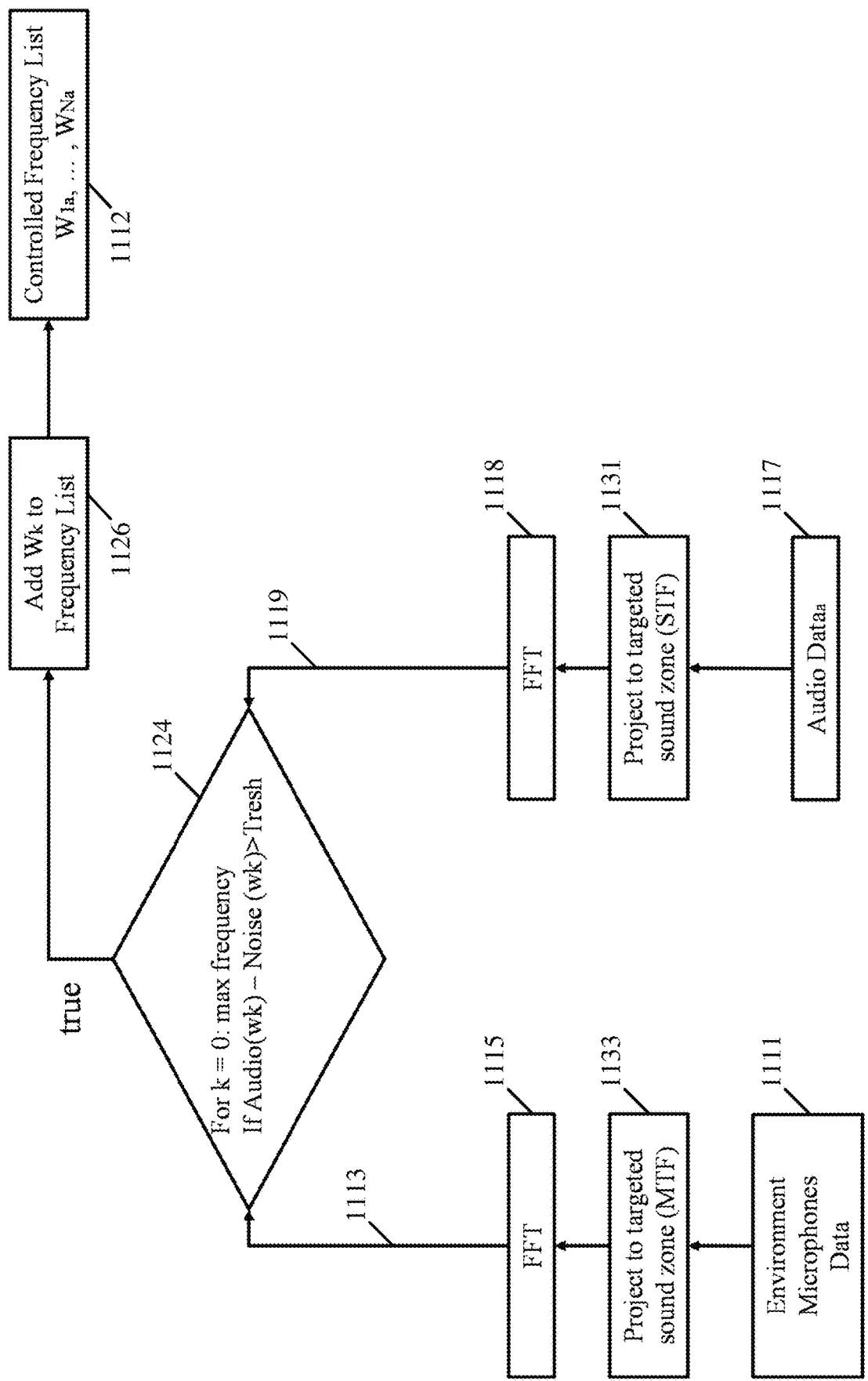
FIG. 11 is a schematic illustration of a frequency selector, in accordance with some demonstrative embodiments.

Reference is made to FIG. 11, which schematically illustrates a frequency selector 1150, in accordance with some demonstrative embodiments. For example, controller 120 (FIG. 1) may be configured to perform one or more operations or functionalities of frequency selector 1150.

In some demonstrative embodiments, as shown in FIG. 11, frequency selector 1150 may be configured to determine a plurality of selected frequencies 1112, e.g., the plurality of selected frequencies 1052 (FIG. 10), to be included in a sound control pattern, e.g., sound control pattern 1032 (FIG. 10).

In some demonstrative embodiments, as shown in FIG. 11, frequency selector 1150 may select the plurality of selected frequencies 1112 from a frequency spectrum, for example, based on environment acoustic information 1111 and an audio input 1117.

In some demonstrative embodiments, as shown in FIG. 11, frequency selector 1150 may determine the plurality of selected frequencies 1112 based on projected audio 1119 and projected environment sound 1113, e.g., as described above.

In some demonstrative embodiments, as shown in FIG. 11, the projected audio 1119 may be based on a projection 1131 of the audio input 1117 by a transfer function from the plurality of transducers 1008 (FIG. 10) to the personal sound zone q, e.g., as described above.

In some demonstrative embodiments, as shown in FIG. 11, the projected environment sound 1113 may be based on a projection 1133 of the environment acoustic sound 1111 by a transfer function from a plurality of predefined environment locations, e.g., the plurality of environment locations 205 (FIG. 1), to the personal sound zone q, e.g., as described above.

In some demonstrative embodiments, as shown in FIG. 11, frequency selector 1150 may generate the projected environment sound 1113 in a frequency domain, for example, using an FFT 1115.

In some demonstrative embodiments, as shown in FIG. 11, frequency selector 1150 may generate the projected audio 1119 in a frequency domain, for example, using an FFT 1118.

In some demonstrative embodiments, as indicated at block 1124, frequency selector 1150 may determine whether a particular frequency Wk is to be included in the plurality of selected frequencies 1112, for example, based on whether or not a difference between the projected audio 1119 at the particular frequency and the projected environment sound 1113 at the particular frequency is greater than a predefined threshold.

some demonstrative embodiments, as indicated at block 1126, frequency selector 1150 may add the particular frequency Wk to the plurality of selected frequencies 1112, for example, when the difference between the projected audio 1119 at the particular frequency and the projected environment sound 1113 at the particular frequency is greater than the predefined threshold.

Figure 12:
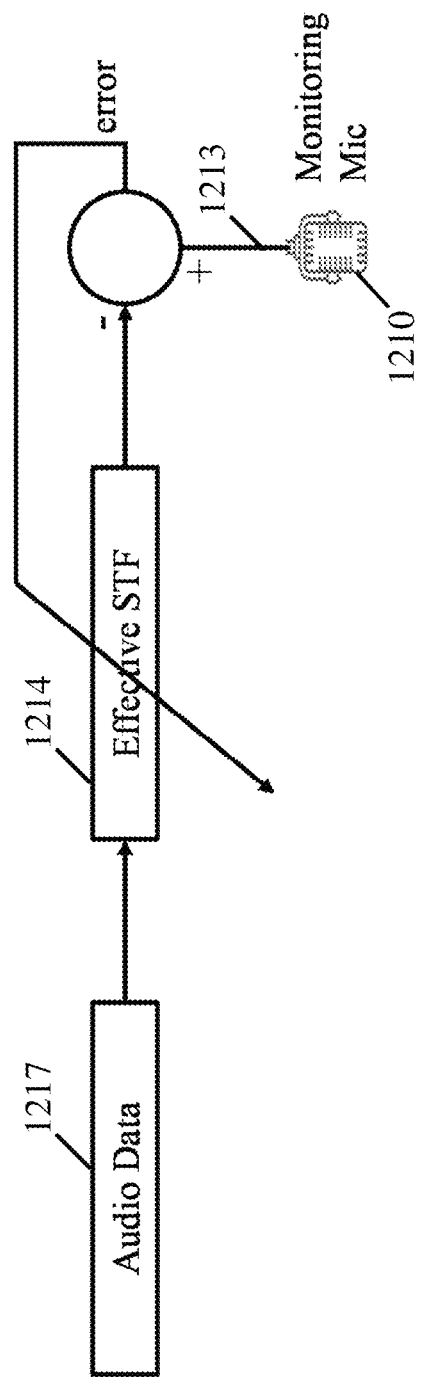
FIG. 12 is a schematic illustration of a Speaker Transfer Function (STF) adapter, in accordance with some demonstrative embodiments.

Reference is made to FIG. 12, which schematically illustrates an STF adapter 1240, in accordance with some demonstrative embodiments. For example, controller 120 (FIG. 1) may be configured to perform one or more operations or functionalities of frequency selector STF adapter 1240.

In some demonstrative embodiments, as shown in FIG. 12, STF adapter 1240 may be configured to process acoustic sound 1213 sensed by a monitoring microphone 1210, for example, at a monitoring sensing location, which may be defined within the personal sound zone q, e.g., as described above.

In some demonstrative embodiments, as shown in FIG. 12, STF adapter 1240 may be configured to dynamically adjust acoustic transfer functions 1214 between the plurality of acoustic transducers 1008 (FIG. 10) and the monitoring sensing location within the personal sound zone q, for example, based on audio input 1217 from the plurality of acoustic transducers 1008 (FIG. 10).

In some demonstrative embodiments, as shown in FIG. 12, STF adapter 1240 may be configured to adapt the acoustic transfer functions 1214, for example, based on a comparison between the acoustic sound 1213 sensed by the monitoring microphone 1210 at the monitoring sensing location and a result of applying the determined acoustic transfer functions 1214 to the audio input 1217, e.g., as described above.

Figure 13:
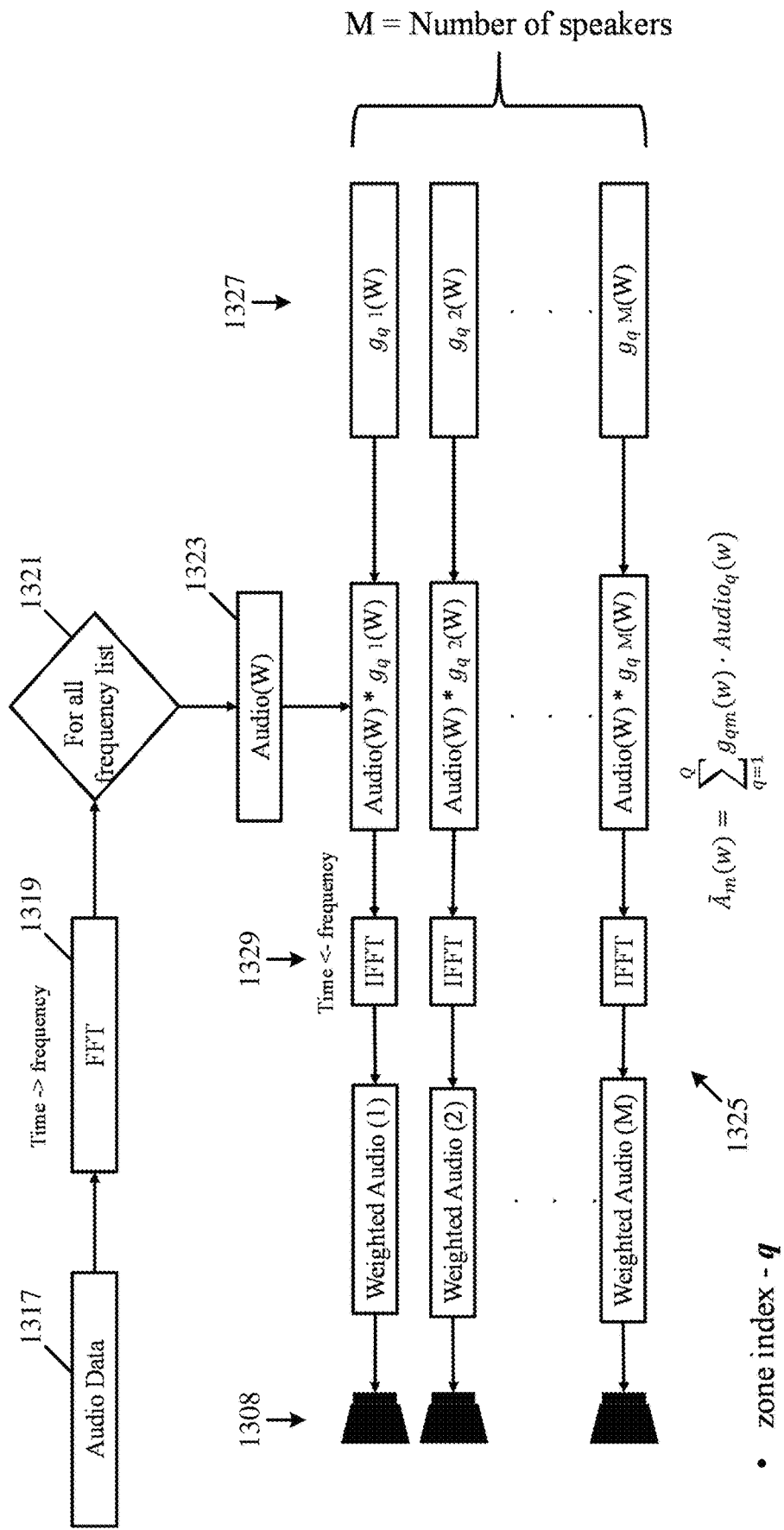
FIG. 13 is a schematic illustration of a sound control pattern generator, in accordance with some demonstrative embodiments.

Reference is made to FIG. 13, which schematically illustrates a sound control pattern generator 1330, in accordance with some demonstrative embodiments. For example, controller 120 (FIG. 1) may be configured to perform one or more operations or functionalities of sound control pattern generator 1330.

In some demonstrative embodiments, as shown in FIG. 13, sound control pattern generator 1330 may process an audio input 1317, e.g., after an FFT operation 1319, and may generate a sound control pattern including a plurality of sound control signals 1325, to be provided to drive a respective plurality of acoustic transducers 1308, e.g., as described below.

For example, as shown in FIG. 13, sound control pattern generator 1330 may generate M sound control signals 1325 to drive a respective plurality of M acoustic transducers 1308, e.g., transducers 108 (FIG. 1).

In some demonstrative embodiments, as indicated at blocks 1321 and 1323, sound control pattern generator 1330 may generate the plurality of sound control signals 1325 by iterating over frequencies W of the plurality of selected frequencies 1052 (FIG. 10), e.g., as described above.

In some demonstrative embodiments, as shown in FIG. 13, sound control pattern generator 1330 may generate the plurality of sound control signals 1325 based on a plurality of weight vectors 1327 corresponding to the plurality of acoustic transducers 1308 for a personal sound zone q, e.g., as described above.

In some demonstrative embodiments, a weight vector 1327 for an acoustic transducer 1308 for the personal sound zone q may be based, for example, on an acoustic transfer function between the acoustic transducer 1308 and the personal sound zone q, e.g., as described above.

In some demonstrative embodiments, as shown in FIG. 13, sound control pattern generator 1330 may generate the plurality of sound control signals 1325 by multiplying the plurality of weight vectors 1327 by the audio input 1317 at the particular frequency w, for example, according to Equation 14, e.g., as described above.

In some demonstrative embodiments, as shown in FIG. 13, sound control pattern generator 1330 may perform an IFFT operation 1329 on the plurality of sound control signals 1325, for example, to convert the sound control signals 1325 from the frequency-domain to the time-domain.

In some demonstrative embodiments, as shown in FIG. 13, sound control pattern generator 1330 may provide the plurality of sound control signals 1325, for example, to the plurality of acoustic transducers 1308.

Figure 14:
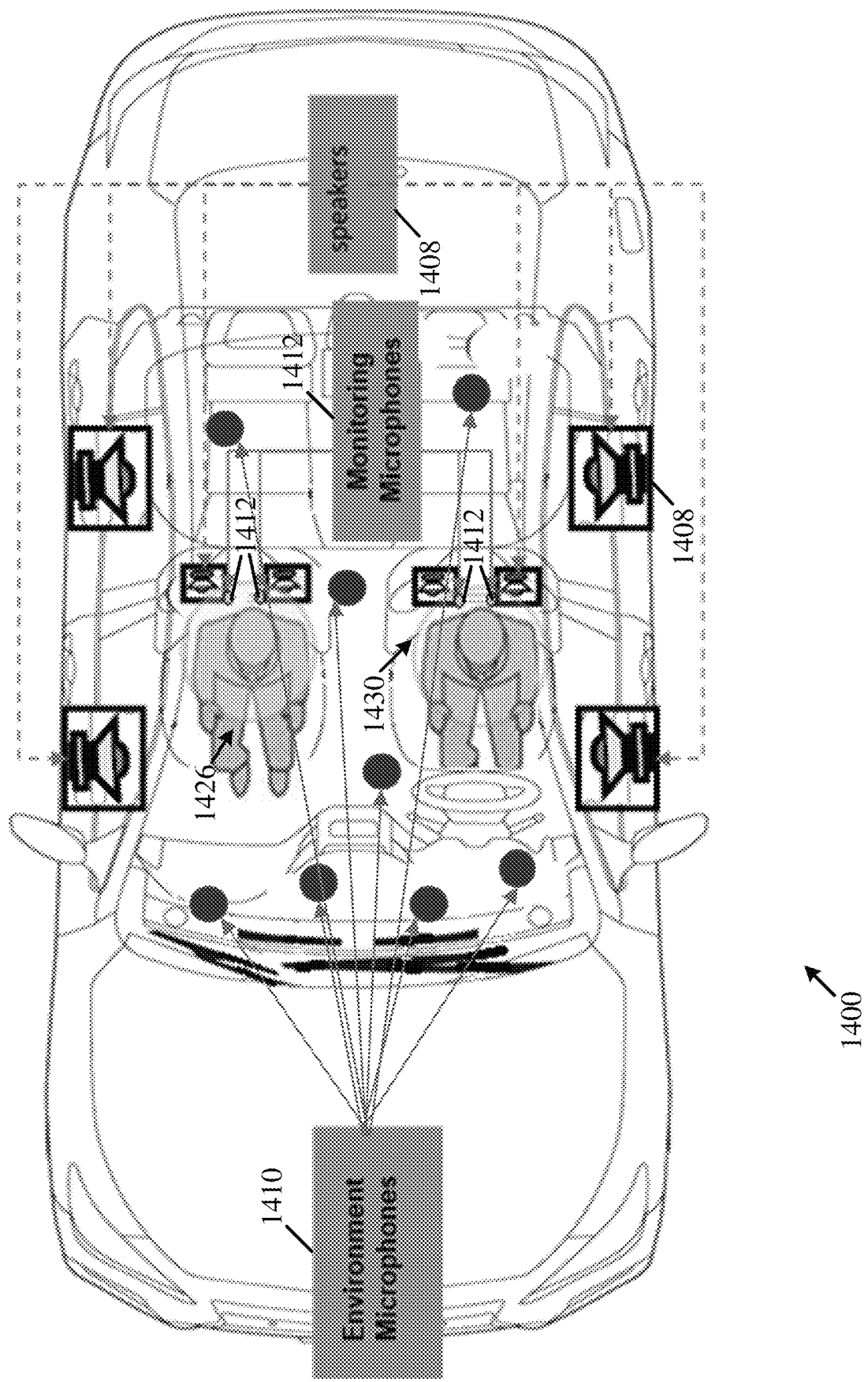
FIG. 14 is a schematic illustration of a vehicle, in accordance with some demonstrative embodiments.

Reference is made to FIG. 14, which schematically illustrates a vehicle 1400, in accordance with some demonstrative embodiments.

In one example, vehicle 1440 may include alone or more elements and/or components of system 100 (FIG. 1), for example, for controlling sound within one or more personal sound zones within vehicle 1400.

In some demonstrative embodiments, as shown in FIG. 14, vehicle 1400 may include a plurality of speakers 1408, a plurality of monitoring microphones 1412, and a plurality of environments microphones 1410.

In some demonstrative embodiments, vehicle 1400 may include controller 120 (FIG. 1) configured to control the plurality of speakers 1408 to provide a first personal sound zone 1420 for a driver of the vehicle 1400, e.g., at a location of a headrest of a driver seat.

In some demonstrative embodiments, controller 120 (FIG. 1) may be configured to control the plurality of speakers 1408 to provide a second personal sound zone 1420, for example, for a passenger, e.g., at a front seat near the driver seat, for example, at a location of a headrest of the passenger seat.

In some demonstrative embodiments, as shown in FIG. 14, the plurality of monitoring microphones 1412 may be located within the first and second personal sounds zones 1420 and 1430.

In some demonstrative embodiments, as shown in FIG. 14, the plurality of environment microphones 1410 may be located in an environment outside the personal sounds zones 1420 and 1430.

In other embodiments, vehicle 1400 may include any other number of the plurality of speakers 1408, the plurality of monitoring microphones 1412, and/or the plurality of environment microphones 1410, any other arrangement, positions and/or locations of the plurality of speakers 1408, the plurality of monitoring microphones 1412, and/or the plurality of environment microphones 1410, and/or any other additional or alternative components.

Figure 15:
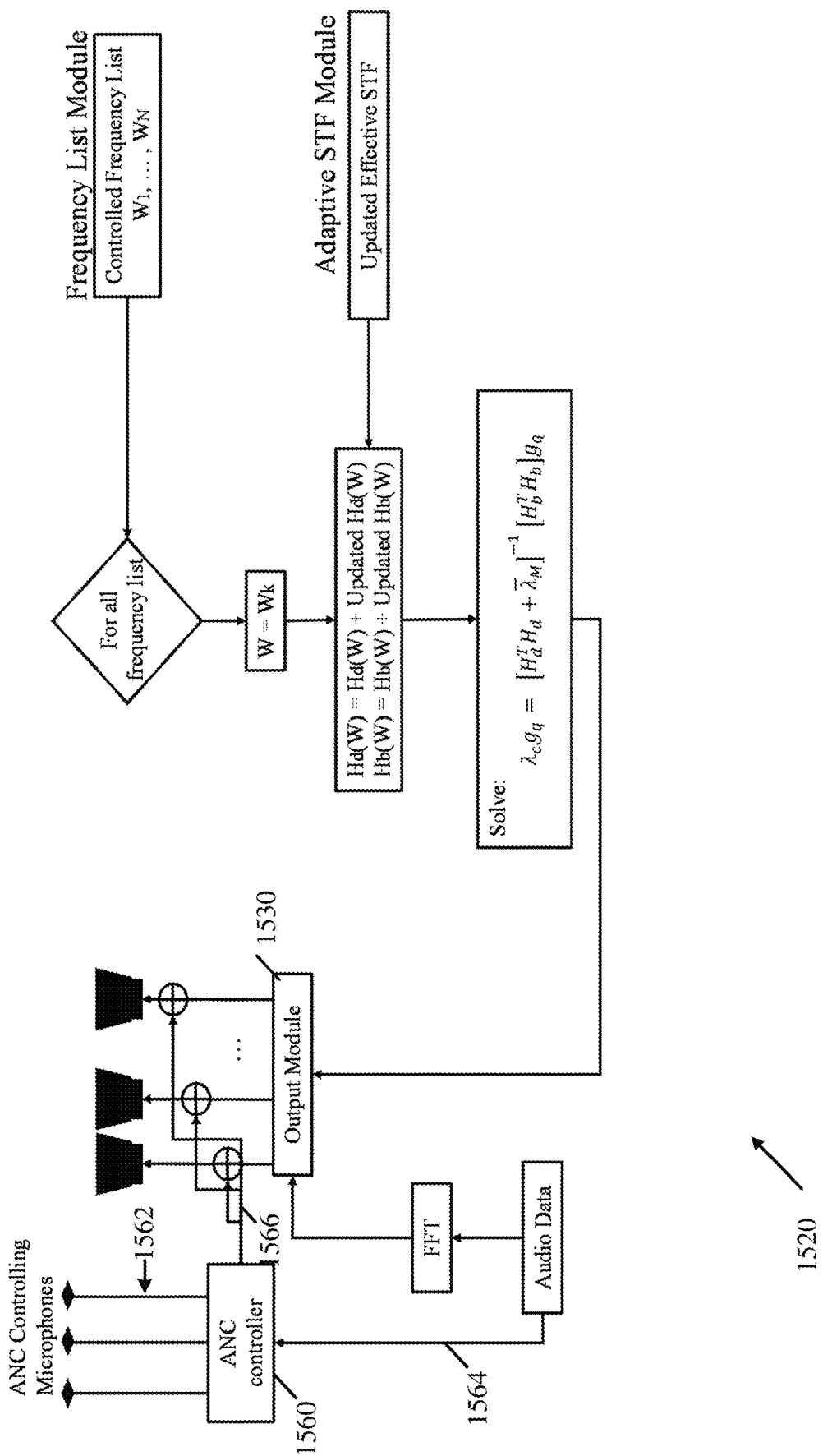
FIG. 15 is a schematic illustration of a controller including an Active Noise Control (ANC) mechanism, in accordance with some demonstrative embodiments.

Reference is made to FIG. 15, which schematically illustrates a controller 1520 including an ANC mechanism, in accordance with some demonstrative embodiments. For example, controller 120 (FIG. 1) may include, perform the role of, perform the functionality of, perform the role of, and/or perform one or more operations of controller 1520.

In some demonstrative embodiments, as shown in FIG. 15, controller 1520 may include an ANC controller 1560, configured to reduce residual noise from outside of the one or more personal sound zones, e.g., as described below.

In some demonstrative embodiments, as shown in FIG. 15, controller 1520 may determine a sound control pattern 1523 to be provided to a plurality of acoustic transducers 1508, for example, by combining an output 1566 of ANC controller 1560 with an output of a sound control pattern generator 1430, e.g., sound control pattern generator 1330 (FIG. 13).

In some demonstrative embodiments, as shown in FIG. 15, ANC controller 1560 may generate output 1566, for example, based on one or more audio inputs 1517, and based on one or more ANC acoustic sensor inputs 1562.

In some demonstrative embodiments, the ANC acoustic sensor inputs 1562 from a personal sound zone may be from one or more sensing locations, which are outside of the personal sound zone. For example, one or more the ANC acoustic sensor inputs 1562 may be from one or more locations around the personal sound zone, e.g., on a perimeter of and/or at a vicinity of, the personal sound zone. In another example, one or more the ANC acoustic sensor inputs 1562 may be from one or more other personal sound zones and/or at any other locations in the environment.

In some demonstrative embodiments, controller 1520 may be configured to sum one or more outputs, e.g., all of the outputs, of output 1566 of the ANC controller 1560 and one or more, e.g., all, of a plurality of sound control signals of the sound control pattern 1523.

In one example, left seat headrest speakers of a left seat in a vehicle, e.g., vehicle 1440 (FIG. 14), may be used for left seat PSB, as well as for ANC, for example, to reduce the audio transmitted to right seat headrest speakers of a right seat in the vehicle, for example, to achieve a PSB for the right seat, and/or vice versa, e.g., with respect to the left seat PSB.

In some demonstrative embodiments, incorporating active noise control technology together with the PSB technology may enable to improve PSB performance, for example, by using ANC controller 1560 to reduce leftover undesired sounds in the personal sound bubble, which may originate, for example, from other personal sound bubbles.

In some demonstrative embodiments, audio streams of audio streams 1517, which may be sent to the ANC controller 1560, e.g., as reference to the ANC controller 1560, may be reduced in zones were those streams are not wanted.

Figure 16:
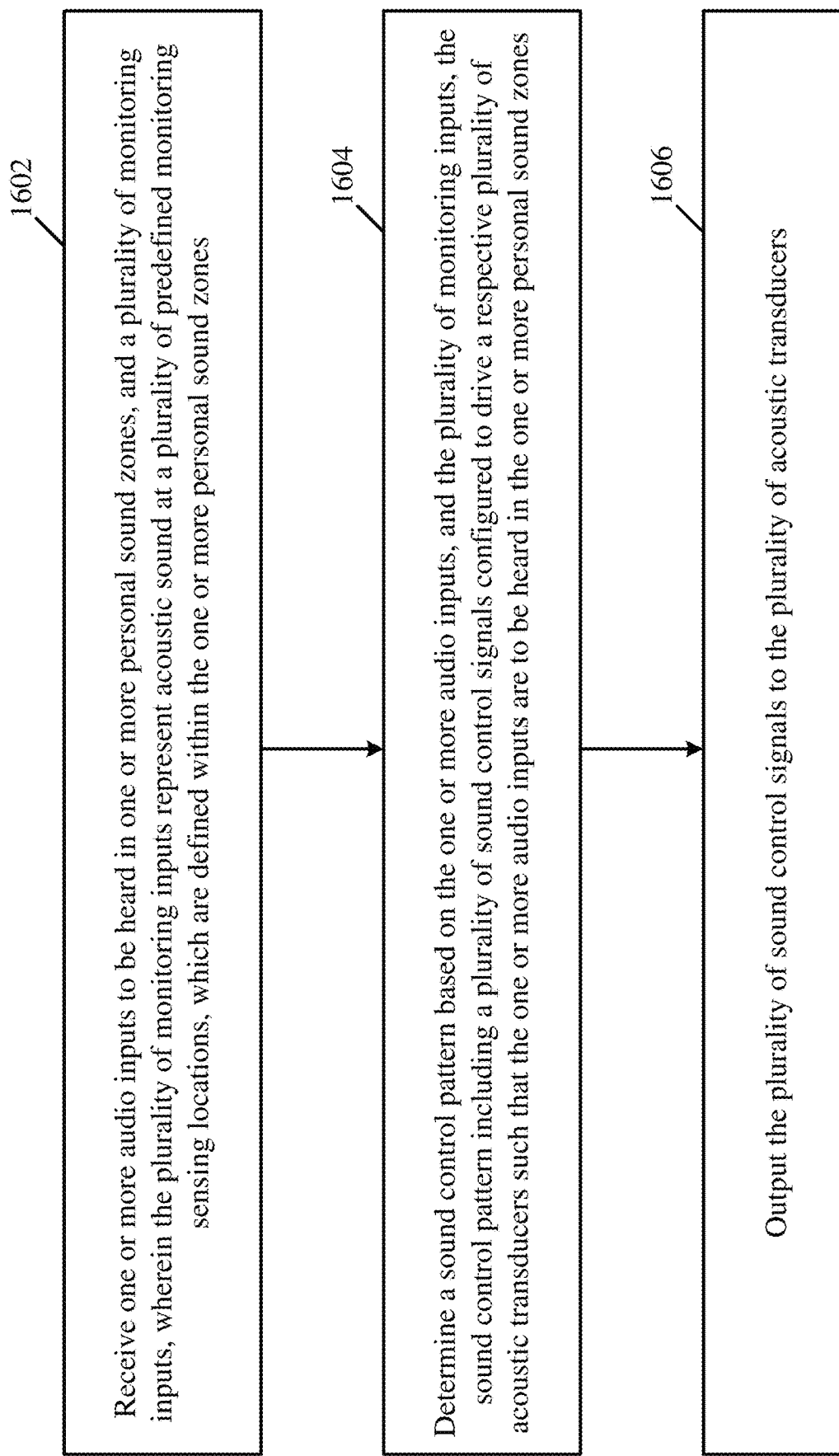
FIG. 16 is a schematic flow-chart illustration of a method of sound control, in accordance with some demonstrative embodiments.

Reference is made to FIG. 16, which schematically illustrates a method of sound control, in accordance with some demonstrative embodiments. For example, one or more operations of the method of FIG. 16 may be performed by one or more elements of a sound control system, e.g., sound control system 100 (FIG. 1), a sound controller, e.g., sound controller 102 (FIG. 1), and/or a controller, e.g., controller 120 (FIG. 1), and/or any other component of a sound control system.

As indicated at block 1602, the method may include receiving one or more audio inputs to be heard in one or more personal sound zones, and a plurality of monitoring inputs, wherein the plurality of monitoring inputs represent acoustic sound at a plurality of predefined monitoring sensing locations, which are defined within the one or more personal sound zones. For example, controller 120 (FIG. 1) may receive the one or more audio inputs 117 (FIG. 1) to be heard in one or more personal sound zones, and the plurality of monitoring inputs 113 that representing the acoustic sound at the plurality of predefined monitoring sensing locations 207 (FIG. 2), which may be defined within the one or more personal sound zones, e.g., as described above.

As indicated at block 1604, the method may include determining a sound control pattern based on the one or more audio inputs, and the plurality of monitoring inputs, the sound control pattern including a plurality of sound control signals configured to drive a respective plurality of acoustic transducers such that the one or more audio inputs are to be heard in the one or more personal sound zones. For example, controller 120 (FIG. 1) may determine the sound control pattern 123 (FIG. 1) based on the one or more audio inputs 117 (FIG. 1), and the plurality of monitoring inputs 113 (FIG. 1), the sound control pattern 123 (FIG. 1) including the plurality of sound control signals configured to drive the respective plurality of acoustic transducers 108 (FIG. 1) such that the one or more audio inputs 117 (FIG. 1) are to be heard in the one or more personal sound zones, e.g., as described above.

As indicated at block 1608 the method may include outputting the plurality of sound control signals to the plurality of acoustic transducers. For example, controller 120 (FIG. 1) may output the plurality of sound control signals to the plurality of acoustic transducers 108 (FIG. 1), e.g., as described above.

Figure 17:
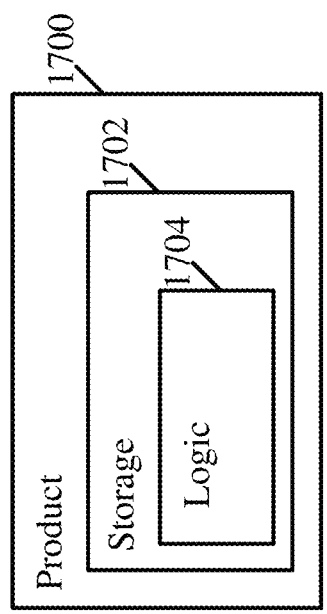
FIG. 17 is a schematic illustration of a product, in accordance with some demonstrative embodiments.

Reference is made to FIG. 17, which schematically illustrates a product of manufacture 1700, in accordance with some demonstrative embodiments. Product 1700 may include one or more tangible computer-readable non-transitory storage media 1702, which may include computer-executable instructions, e.g., implemented by logic 1704, operable to, when executed by at least one computer processor, enable the at least one computer processor to implement one or more operations at sound control system 100 (FIG. 1), and/or controller 120 (FIG. 1), and/or to perform, trigger and/or implement one or more operations, communications and/or functionalities according to one or more FIGS. 1-16, and/or one or more operations described herein. The phrase "non-transitory machine-readable medium" is directed to include all computer-readable media, with the sole exception being a transitory propagating signal.

In some demonstrative embodiments, product 1700 and/or machine-readable storage medium 1702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a Solid State Drive (SSD), a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Python, Java, BASIC, Matlab, Pascal, Visual BASIC, assembly language, machine code, and the like.

EXAMPLES

The following examples pertain to further embodiments.

Example 1 includes an apparatus comprising an input to receive one or more audio inputs to be heard in one or more personal sound zones, and a plurality of monitoring inputs, wherein the plurality of monitoring inputs represent acoustic sound at a plurality of predefined monitoring sensing locations, which are defined within the one or more personal sound zones; a controller configured to determine a sound control pattern based on the one or more audio inputs, and the plurality of monitoring inputs, the sound control pattern comprising a plurality of sound control signals configured to drive a respective plurality of acoustic transducers such that the one or more audio inputs are to be heard in the one or more personal sound zones; and an output to output the plurality of sound control signals to the plurality of acoustic transducers.

Example 2 includes the subject matter of Example 1, and optionally, wherein the input is configured to receive environment acoustic information representing environment acoustic sound at a plurality of predefined environment locations, which are defined with respect to an environment including the one or more personal sound zones, the controller configured to determine the sound control pattern based on the environment acoustic information.

Example 3 includes the subject matter of Example 2, and optionally, wherein the environment acoustic information comprises information of acoustic sound sensed by an acoustic sensor at an environment location of the plurality of predefined environment locations.

Example 4 includes the subject matter of Example 2 or 3, and optionally, wherein the environment acoustic information comprises information of at least one of an audio signal, or acoustic sound generated by a predefined audio source.

Example 5 includes the subject matter of any one of Examples 2-4, and optionally, wherein the controller is configured to determine a plurality of selected frequencies to be included in the sound control pattern, the controller configured to select the plurality of selected frequencies from a frequency spectrum based on the environment acoustic information and the one or more audio inputs.

Example 6 includes the subject matter of Example 5, and optionally, wherein the controller is configured to determine the plurality of selected frequencies based on projected audio and projected environment sound, the projected audio is based on a projection of an audio input, which is to be heard at a personal sound zone, by a transfer function from the plurality of transducers to the personal sound zone, the projected environment sound is based on a projection of the environment acoustic sound by a transfer function from a plurality of predefined environment locations to the personal sound zone.

Example 7 includes the subject matter of Example 6, and optionally, wherein the controller is configured to determine whether a particular frequency is to be included in the plurality of selected frequencies based on the projected audio at the particular frequency and the projected environment sound at the particular frequency.

Example 8 includes the subject matter of Example 7, and optionally, wherein the controller is configured to determine that the particular frequency is to be included in the plurality of selected frequencies when a difference between the projected audio at the particular frequency and the projected environment sound at the particular frequency is greater than a predefined threshold.

Example 9 includes the subject matter of any one of Examples 1-8, and optionally, wherein the controller is configured to determine the plurality of sound control signals based on one or more sets of weight vectors corresponding to the one or more personal sound zones, respectively, a set of weight vectors corresponding to a personal sound zone comprising a plurality of weight vectors corresponding to the plurality of acoustic transducers, respectively, a weight vector in the set of weight vectors is based on an acoustic transfer function between an acoustic transducer of the plurality of acoustic transducers and the personal sound zone.

Example 10 includes the subject matter of Example 9, and optionally, wherein the controller is configured to determine a sound control signal for a particular acoustic transducer by applying to an audio input to be heard in the personal sound zone a weight vector corresponding to the particular acoustic transducer from the set of weight vectors corresponding to the personal sound zone.

Example 11 includes the subject matter of Example 9 or 10, and optionally, wherein the controller is configured to determine the set of weight vectors corresponding to the personal sound zone based on a first plurality of acoustic transfer functions and a second plurality of acoustic transfer functions, the first plurality of acoustic transfer functions comprising acoustic transfer functions between the plurality of acoustic transducers and the personal sound zone, the second plurality of acoustic transfer functions comprising acoustic transfer functions between the plurality of acoustic transducers and one or more monitoring locations outside the personal sound zone.

Example 12 includes the subject matter of Example 11, and optionally, wherein the controller is configured to adjust one or more acoustic transfer functions in the first or second pluralities of acoustic transfer functions based on environment acoustic information representing environment acoustic sound at a plurality of predefined environment locations, which are defined with respect to an environment including the one or more personal sound zones.

Example 13 includes the subject matter of Example 11 or 12, and optionally, wherein the controller is configured to adjust one or more acoustic transfer functions in the first or second pluralities of acoustic transfer functions based on a change in the location of the personal sound zone.

Example 14 includes the subject matter of any one of Examples 11-13, and optionally, wherein the controller is configured to adjust one or more acoustic transfer functions in the first or second pluralities of acoustic transfer functions based on environment parameter information of one or more environmental parameters of an environment including the one or more personal sound zones.

Example 15 includes the subject matter of any one of Examples 9-14, and optionally, wherein the controller is configured to determine the set of weight vectors corresponding to the personal sound zone based on a criterion relating to a contrast between a first acoustic energy and a second acoustic energy, wherein the first acoustic energy comprises an acoustic energy at the personal sound zone based on the set of weight vectors corresponding to the personal sound zone, wherein the second acoustic energy comprises an acoustic energy at one or more monitoring locations outside the personal sound zone based on the set of weight vectors corresponding to the personal sound zone.

Example 16 includes the subject matter of Example 15, and optionally, wherein the criterion comprises limiting the first energy based on a volume at which the audio input is to be heard in the personal sound zone, and minimizing the second energy.

Example 17 includes the subject matter of any one of Examples 9-16, and optionally, wherein the weight vector comprises a plurality of weights corresponding to a respective plurality of acoustic frequencies.

Example 18 includes the subject matter of any one of Examples 1-17, and optionally, wherein the controller is configured to determine the sound control pattern based on at least first and second audio inputs, the first audio input for a first personal sound zone, the second audio input for a second personal sound zone, wherein the controller is configured to determine the sound control pattern based on a first plurality of monitoring inputs representing acoustic sound at a first plurality of monitoring sensing locations, which are defined within the first personal sound zone, and a second plurality of monitoring inputs representing acoustic sound at a second plurality of monitoring sensing locations, which are defined within the second personal sound zone.

Example 19 includes the subject matter of any one of Examples 1-18, and optionally, wherein the controller is configured to determine the sound control pattern based on an Active Noise Cancellation (ANC) mechanism configured to reduce residual noise from outside of the one or more personal sound zones based on the one or more audio inputs and based on one or more ANC acoustic sensor inputs.

Example 20 includes a system of sound control, the system comprising a plurality of monitoring acoustic sensors to sense acoustic sound at a plurality of predefined monitoring sensing locations, which are defined within one or more personal sound zones; a plurality of acoustic transducers; and a controller to receive one or more audio inputs to be heard in the one or more personal sound zones, and a plurality of monitoring inputs from the plurality of monitoring acoustic sensors, wherein the plurality of monitoring inputs represent the acoustic sound at the plurality of predefined monitoring sensing locations, wherein the controller is configured to determine a sound control pattern based on the one or more audio inputs, and the plurality of monitoring inputs, the sound control pattern comprising a plurality of sound control signals configured to drive the plurality of acoustic transducers, respectively, such that the one or more audio inputs are to be heard in the one or more personal sound zones.

Example 21 includes the subject matter of Example 20, and optionally, wherein the controller is configured to receive environment acoustic information representing environment acoustic sound at a plurality of predefined environment locations, which are defined with respect to an environment including the one or more personal sound zones, the controller configured to determine the sound control pattern based on the environment acoustic information.

Example 22 includes the subject matter of Example 21, and optionally, wherein the environment acoustic information comprises information of acoustic sound sensed by an acoustic sensor at an environment location of the plurality of predefined environment locations.

Example 23 includes the subject matter of Example 21 or 22, and optionally, wherein the environment acoustic information comprises information of at least one of an audio signal, or acoustic sound generated by a predefined audio source.

Example 24 includes the subject matter of any one of Examples 21-23, and optionally, wherein the controller is configured to determine a plurality of selected frequencies to be included in the sound control pattern, the controller configured to select the plurality of selected frequencies from a frequency spectrum based on the environment acoustic information and the one or more audio inputs.

Example 25 includes the subject matter of Example 24, and optionally, wherein the controller is configured to determine the plurality of selected frequencies based on projected audio and projected environment sound, the projected audio is based on a projection of an audio input, which is to be heard at a personal sound zone, by a transfer function from the plurality of transducers to the personal sound zone, the projected environment sound is based on a projection of the environment acoustic sound by a transfer function from a plurality of predefined environment locations to the personal sound zone.

Example 26 includes the subject matter of Example 25, and optionally, wherein the controller is configured to determine whether a particular frequency is to be included in the plurality of selected frequencies based on the projected audio at the particular frequency and the projected environment sound at the particular frequency.

Example 27 includes the subject matter of Example 26, and optionally, wherein the controller is configured to determine that the particular frequency is to be included in the plurality of selected frequencies when a difference between the projected audio at the particular frequency and the projected environment sound at the particular frequency is greater than a predefined threshold.

Example 28 includes the subject matter of any one of Examples 20-27, and optionally, wherein the controller is configured to determine the plurality of sound control signals based on one or more sets of weight vectors corresponding to the one or more personal sound zones, respectively, a set of weight vectors corresponding to a personal sound zone comprising a plurality of weight vectors corresponding to the plurality of acoustic transducers, respectively, a weight vector in the set of weight vectors is based on an acoustic transfer function between an acoustic transducer of the plurality of acoustic transducers and the personal sound zone.

Example 29 includes the subject matter of Example 28, and optionally, wherein the controller is configured to determine a sound control signal for a particular acoustic transducer by applying to an audio input to be heard in the personal sound zone a weight vector corresponding to the particular acoustic transducer from the set of weight vectors corresponding to the personal sound zone.

Example 30 includes the subject matter of Example 28 or 29, and optionally, wherein the controller is configured to determine the set of weight vectors corresponding to the personal sound zone based on a first plurality of acoustic transfer functions and a second plurality of acoustic transfer functions, the first plurality of acoustic transfer functions comprising acoustic transfer functions between the plurality of acoustic transducers and the personal sound zone, the second plurality of acoustic transfer functions comprising acoustic transfer functions between the plurality of acoustic transducers and one or more monitoring locations outside the personal sound zone.

Example 31 includes the subject matter of Example 30, and optionally, wherein the controller is configured to adjust one or more acoustic transfer functions in the first or second pluralities of acoustic transfer functions based on environment acoustic information representing environment acoustic sound at a plurality of predefined environment locations, which are defined with respect to an environment including the one or more personal sound zones.

Example 32 includes the subject matter of Example 30 or 31, and optionally, wherein the controller is configured to adjust one or more acoustic transfer functions in the first or second pluralities of acoustic transfer functions based on a change in the location of the personal sound zone.

Example 33 includes the subject matter of any one of Examples 30-32, and optionally, wherein the controller is configured to adjust one or more acoustic transfer functions in the first or second pluralities of acoustic transfer functions based on environment parameter information of one or more environmental parameters of an environment including the one or more personal sound zones.

Example 34 includes the subject matter of any one of Examples 28-33, and optionally, wherein the controller is configured to determine the set of weight vectors corresponding to the personal sound zone based on a criterion relating to a contrast between a first acoustic energy and a second acoustic energy, wherein the first acoustic energy comprises an acoustic energy at the personal sound zone based on the set of weight vectors corresponding to the personal sound zone, wherein the second acoustic energy comprises an acoustic energy at one or more monitoring locations outside the personal sound zone based on the set of weight vectors corresponding to the personal sound zone.

Example 35 includes the subject matter of Example 34, and optionally, wherein the criterion comprises limiting the first energy based on a volume at which the audio input is to be heard in the personal sound zone, and minimizing the second energy.

Example 36 includes the subject matter of any one of Examples 28-35, and optionally, wherein the weight vector comprises a plurality of weights corresponding to a respective plurality of acoustic frequencies.

Example 37 includes the subject matter of any one of Examples 20-36, and optionally, wherein the controller is configured to determine the sound control pattern based on at least first and second audio inputs, the first audio input for a first personal sound zone, the second audio input for a second personal sound zone, wherein the controller is configured to determine the sound control pattern based on a first plurality of monitoring inputs representing acoustic sound at a first plurality of monitoring sensing locations, which are defined within the first personal sound zone, and a second plurality of monitoring inputs representing acoustic sound at a second plurality of monitoring sensing locations, which are defined within the second personal sound zone.

Example 38 includes the subject matter of any one of Examples 20-37, and optionally, wherein the controller is configured to determine the sound control pattern based on an Active Noise Cancellation (ANC) mechanism configured to reduce residual noise from outside of the one or more personal sound zones based on the one or more audio inputs and based on one or more ANC acoustic sensor inputs.

Example 39 includes a vehicle comprising one or more seats; and a sound control system configured to control sound within one or more personal sound zones defined with respect to the one or more seats, the sound control system comprising a plurality of monitoring acoustic sensors to sense acoustic sound at a plurality of predefined monitoring sensing locations, which are defined within the one or more personal sound zones; a plurality of acoustic transducers; and a controller to receive one or more audio inputs to be heard in the one or more personal sound zones, and a plurality of monitoring inputs from the plurality of monitoring acoustic sensors, wherein the plurality of monitoring inputs represent the acoustic sound at the plurality of predefined monitoring sensing locations, wherein the controller is configured to determine a sound control pattern based on the one or more audio inputs, and the plurality of monitoring inputs, the sound control pattern comprising a plurality of sound control signals configured to drive the plurality of acoustic transducers, respectively, such that the one or more audio inputs are to be heard in the one or more personal sound zones.

Example 40 includes the subject matter of Example 39, and optionally, wherein the controller is configured to receive environment acoustic information representing environment acoustic sound at a plurality of predefined environment locations, which are defined with respect to an environment including the one or more personal sound zones, the controller configured to determine the sound control pattern based on the environment acoustic information.

Example 41 includes the subject matter of Example 40, and optionally, wherein the environment acoustic information comprises information of acoustic sound sensed by an acoustic sensor at an environment location of the plurality of predefined environment locations.

Example 42 includes the subject matter of Example 40 or 41, and optionally, wherein the environment acoustic information comprises information of at least one of an audio signal, or acoustic sound generated by a predefined audio source.

Example 43 includes the subject matter of any one of Examples 40-42, and optionally, wherein the controller is configured to determine a plurality of selected frequencies to be included in the sound control pattern, the controller configured to select the plurality of selected frequencies from a frequency spectrum based on the environment acoustic information and the one or more audio inputs.

Example 44 includes the subject matter of Example 43, and optionally, wherein the controller is configured to determine the plurality of selected frequencies based on projected audio and projected environment sound, the projected audio is based on a projection of an audio input, which is to be heard at a personal sound zone, by a transfer function from the plurality of transducers to the personal sound zone, the projected environment sound is based on a projection of the environment acoustic sound by a transfer function from a plurality of predefined environment locations to the personal sound zone.

Example 45 includes the subject matter of Example 44, and optionally, wherein the controller is configured to determine whether a particular frequency is to be included in the plurality of selected frequencies based on the projected audio at the particular frequency and the projected environment sound at the particular frequency.

Example 46 includes the subject matter of Example 45, and optionally, wherein the controller is configured to determine that the particular frequency is to be included in the plurality of selected frequencies when a difference between the projected audio at the particular frequency and the projected environment sound at the particular frequency is greater than a predefined threshold.

Example 47 includes the subject matter of any one of Examples 39-46, and optionally, wherein the controller is configured to determine the plurality of sound control signals based on one or more sets of weight vectors corresponding to the one or more personal sound zones, respectively, a set of weight vectors corresponding to a personal sound zone comprising a plurality of weight vectors corresponding to the plurality of acoustic transducers, respectively, a weight vector in the set of weight vectors is based on an acoustic transfer function between an acoustic transducer of the plurality of acoustic transducers and the personal sound zone.

Example 48 includes the subject matter of Example 47, and optionally, wherein the controller is configured to determine a sound control signal for a particular acoustic transducer by applying to an audio input to be heard in the personal sound zone a weight vector corresponding to the particular acoustic transducer from the set of weight vectors corresponding to the personal sound zone.

Example 49 includes the subject matter of Example 47 or 48, and optionally, wherein the controller is configured to determine the set of weight vectors corresponding to the personal sound zone based on a first plurality of acoustic transfer functions and a second plurality of acoustic transfer functions, the first plurality of acoustic transfer functions comprising acoustic transfer functions between the plurality of acoustic transducers and the personal sound zone, the second plurality of acoustic transfer functions comprising acoustic transfer functions between the plurality of acoustic transducers and one or more monitoring locations outside the personal sound zone.

Example 50 includes the subject matter of Example 49, and optionally, wherein the controller is configured to adjust one or more acoustic transfer functions in the first or second pluralities of acoustic transfer functions based on environment acoustic information representing environment acoustic sound at a plurality of predefined environment locations, which are defined with respect to an environment including the one or more personal sound zones.

Example 51 includes the subject matter of Example 49 or 50, and optionally, wherein the controller is configured to adjust one or more acoustic transfer functions in the first or second pluralities of acoustic transfer functions based on a change in the location of the personal sound zone.

Example 52 includes the subject matter of any one of Examples 49-51, and optionally, wherein the controller is configured to adjust one or more acoustic transfer functions in the first or second pluralities of acoustic transfer functions based on environment parameter information of one or more environmental parameters of an environment including the one or more personal sound zones.

Example 53 includes the subject matter of any one of Examples 47-52, and optionally, wherein the controller is configured to determine the set of weight vectors corresponding to the personal sound zone based on a criterion relating to a contrast between a first acoustic energy and a second acoustic energy, wherein the first acoustic energy comprises an acoustic energy at the personal sound zone based on the set of weight vectors corresponding to the personal sound zone, wherein the second acoustic energy comprises an acoustic energy at one or more monitoring locations outside the personal sound zone based on the set of weight vectors corresponding to the personal sound zone.

Example 54 includes the subject matter of Example 53, and optionally, wherein the criterion comprises limiting the first energy based on a volume at which the audio input is to be heard in the personal sound zone, and minimizing the second energy.

Example 55 includes the subject matter of any one of Examples 47-54, and optionally, wherein the weight vector comprises a plurality of weights corresponding to a respective plurality of acoustic frequencies.

Example 56 includes the subject matter of any one of Examples 39-55, and optionally, wherein the controller is configured to determine the sound control pattern based on at least first and second audio inputs, the first audio input for a first personal sound zone, the second audio input for a second personal sound zone, wherein the controller is configured to determine the sound control pattern based on a first plurality of monitoring inputs representing acoustic sound at a first plurality of monitoring sensing locations, which are defined within the first personal sound zone, and a second plurality of monitoring inputs representing acoustic sound at a second plurality of monitoring sensing locations, which are defined within the second personal sound zone.

Example 57 includes the subject matter of any one of Examples 39-56, and optionally, wherein the controller is configured to determine the sound control pattern based on an Active Noise Cancellation (ANC) mechanism configured to reduce residual noise from outside of the one or more personal sound zones based on the one or more audio inputs and based on one or more ANC acoustic sensor inputs.

Example 58 includes a method of sound control, the method comprising processing one or more audio inputs to be heard in one or more personal sound zones, and a plurality of monitoring inputs, wherein the plurality of monitoring inputs represent acoustic sound at a plurality of predefined monitoring sensing locations, which are defined within the one or more personal sound zones; determining a sound control pattern based on the one or more audio inputs, and the plurality of monitoring inputs, the sound control pattern comprising a plurality of sound control signals configured to drive a respective plurality of acoustic transducers such that the one or more audio inputs are to be heard in the one or more personal sound zones; and outputting the plurality of sound control signals to the plurality of acoustic transducers.

Example 59 includes the subject matter of Example 58, and optionally, comprising receiving environment acoustic information representing environment acoustic sound at a plurality of predefined environment locations, which are defined with respect to an environment including the one or more personal sound zones, and determining the sound control pattern based on the environment acoustic information.

Example 60 includes the subject matter of Example 59, and optionally, wherein the environment acoustic information comprises information of acoustic sound sensed by an acoustic sensor at an environment location of the plurality of predefined environment locations.

Example 61 includes the subject matter of Example 59 or 60, and optionally, wherein the environment acoustic information comprises information of at least one of an audio signal, or acoustic sound generated by a predefined audio source.

Example 62 includes the subject matter of any one of Examples 59-61, and optionally, comprising determining a plurality of selected frequencies to be included in the sound control pattern, and selecting the plurality of selected frequencies from a frequency spectrum based on the environment acoustic information and the one or more audio inputs.

Example 63 includes the subject matter of Example 62, and optionally, comprising determining the plurality of selected frequencies based on projected audio and projected environment sound, the projected audio is based on a projection of an audio input, which is to be heard at a personal sound zone, by a transfer function from the plurality of transducers to the personal sound zone, the projected environment sound is based on a projection of the environment acoustic sound by a transfer function from a plurality of predefined environment locations to the personal sound zone.

Example 64 includes the subject matter of Example 63, and optionally, comprising determining whether a particular frequency is to be included in the plurality of selected frequencies based on the projected audio at the particular frequency and the projected environment sound at the particular frequency.

Example 65 includes the subject matter of Example 64, and optionally, comprising determining that the particular frequency is to be included in the plurality of selected frequencies when a difference between the projected audio at the particular frequency and the projected environment sound at the particular frequency is greater than a predefined threshold.

Example 66 includes the subject matter of any one of Examples 58-65, and optionally, comprising determining the plurality of sound control signals based on one or more sets of weight vectors corresponding to the one or more personal sound zones, respectively, a set of weight vectors corresponding to a personal sound zone comprising a plurality of weight vectors corresponding to the plurality of acoustic transducers, respectively, a weight vector in the set of weight vectors is based on an acoustic transfer function between an acoustic transducer of the plurality of acoustic transducers and the personal sound zone.

Example 67 includes the subject matter of Example 66, and optionally, comprising determining a sound control signal for a particular acoustic transducer by applying to an audio input to be heard in the personal sound zone a weight vector corresponding to the particular acoustic transducer from the set of weight vectors corresponding to the personal sound zone.

Example 68 includes the subject matter of Example 66 or 67, and optionally, comprising determining the set of weight vectors corresponding to the personal sound zone based on a first plurality of acoustic transfer functions and a second plurality of acoustic transfer functions, the first plurality of acoustic transfer functions comprising acoustic transfer functions between the plurality of acoustic transducers and the personal sound zone, the second plurality of acoustic transfer functions comprising acoustic transfer functions between the plurality of acoustic transducers and one or more monitoring locations outside the personal sound zone.

Example 69 includes the subject matter of Example 68, and optionally, comprising adjusting one or more acoustic transfer functions in the first or second pluralities of acoustic transfer functions based on environment acoustic information representing environment acoustic sound at a plurality of predefined environment locations, which are defined with respect to an environment including the one or more personal sound zones.

Example 70 includes the subject matter of Example 68 or 69, and optionally, comprising adjusting one or more acoustic transfer functions in the first or second pluralities of acoustic transfer functions based on a change in the location of the personal sound zone.

Example 71 includes the subject matter of any one of Examples 68-70, and optionally, comprising adjusting one or more acoustic transfer functions in the first or second pluralities of acoustic transfer functions based on environment parameter information of one or more environmental parameters of an environment including the one or more personal sound zones.

Example 72 includes the subject matter of any one of Examples 66-71, and optionally, comprising determining the set of weight vectors corresponding to the personal sound zone based on a criterion relating to a contrast between a first acoustic energy and a second acoustic energy, wherein the first acoustic energy comprises an acoustic energy at the personal sound zone based on the set of weight vectors corresponding to the personal sound zone, wherein the second acoustic energy comprises an acoustic energy at one or more monitoring locations outside the personal sound zone based on the set of weight vectors corresponding to the personal sound zone.

Example 73 includes the subject matter of Example 72, and optionally, wherein the criterion comprises limiting the first energy based on a volume at which the audio input is to be heard in the personal sound zone, and minimizing the second energy.

Example 74 includes the subject matter of any one of Examples 66-73, and optionally, wherein the weight vector comprises a plurality of weights corresponding to a respective plurality of acoustic frequencies.

Example 75 includes the subject matter of any one of Examples 58-74, and optionally, comprising determining the sound control pattern based on at least first and second audio inputs, the first audio input for a first personal sound zone, the second audio input for a second personal sound zone, and determining the sound control pattern based on a first plurality of monitoring inputs representing acoustic sound at a first plurality of monitoring sensing locations, which are defined within the first personal sound zone, and a second plurality of monitoring inputs representing acoustic sound at a second plurality of monitoring sensing locations, which are defined within the second personal sound zone.

Example 76 includes the subject matter of any one of Examples 58-75, and optionally, comprising determining the sound control pattern based on an Active Noise Cancellation (ANC) mechanism configured to reduce residual noise from outside of the one or more personal sound zones based on the one or more audio inputs and based on one or more ANC acoustic sensor inputs.

Example 77 includes a product comprising one or more tangible computer-readable non-transitory storage media comprising computer-executable instructions operable to, when executed by at least one processor, enable the at least one processor to cause a system of sound control to process one or more audio inputs to be heard in one or more personal sound zones, and a plurality of monitoring inputs, wherein the plurality of monitoring inputs represent acoustic sound at a plurality of predefined monitoring sensing locations, which are defined within the one or more personal sound zones; determine a sound control pattern based on the one or more audio inputs, and the plurality of monitoring inputs, the sound control pattern comprising a plurality of sound control signals configured to drive a respective plurality of acoustic transducers such that the one or more audio inputs are to be heard in the one or more personal sound zones; and output the plurality of sound control signals to the plurality of acoustic transducers.

Example 78 includes the subject matter of Example 77, and optionally, wherein the instructions, when executed, cause the system of sound control to receive environment acoustic information representing environment acoustic sound at a plurality of predefined environment locations, which are defined with respect to an environment including the one or more personal sound zones, and to determine the sound control pattern based on the environment acoustic information.

Example 79 includes the subject matter of Example 78, and optionally, wherein the environment acoustic information comprises information of acoustic sound sensed by an acoustic sensor at an environment location of the plurality of predefined environment locations.

Example 80 includes the subject matter of Example 78 or 79, and optionally, wherein the environment acoustic information comprises information of at least one of an audio signal, or acoustic sound generated by a predefined audio source.

Example 81 includes the subject matter of any one of Examples 78-80, and optionally, wherein the instructions, when executed, cause the system of sound control to determine a plurality of selected frequencies to be included in the sound control pattern, and to select the plurality of selected frequencies from a frequency spectrum based on the environment acoustic information and the one or more audio inputs.

Example 82 includes the subject matter of Example 81, and optionally, wherein the instructions, when executed, cause the system of sound control to determine the plurality of selected frequencies based on projected audio and projected environment sound, the projected audio is based on a projection of an audio input, which is to be heard at a personal sound zone, by a transfer function from the plurality of transducers to the personal sound zone, the projected environment sound is based on a projection of the environment acoustic sound by a transfer function from a plurality of predefined environment locations to the personal sound zone.

Example 83 includes the subject matter of Example 82, and optionally, wherein the instructions, when executed, cause the system of sound control to determine whether a particular frequency is to be included in the plurality of selected frequencies based on the projected audio at the particular frequency and the projected environment sound at the particular frequency.

Example 84 includes the subject matter of Example 83, and optionally, wherein the instructions, when executed, cause the system of sound control to determine that the particular frequency is to be included in the plurality of selected frequencies when a difference between the projected audio at the particular frequency and the projected environment sound at the particular frequency is greater than a predefined threshold.

Example 85 includes the subject matter of any one of Examples 77-84, and optionally, wherein the instructions, when executed, cause the system of sound control to determine the plurality of sound control signals based on one or more sets of weight vectors corresponding to the one or more personal sound zones, respectively, a set of weight vectors corresponding to a personal sound zone comprising a plurality of weight vectors corresponding to the plurality of acoustic transducers, respectively, a weight vector in the set of weight vectors is based on an acoustic transfer function between an acoustic transducer of the plurality of acoustic transducers and the personal sound zone.

Example 86 includes the subject matter of Example 85, and optionally, wherein the instructions, when executed, cause the system of sound control to determine a sound control signal for a particular acoustic transducer by applying to an audio input to be heard in the personal sound zone a weight vector corresponding to the particular acoustic transducer from the set of weight vectors corresponding to the personal sound zone.

Example 87 includes the subject matter of Example 85 or 86, and optionally, wherein the instructions, when executed, cause the system of sound control to determine the set of weight vectors corresponding to the personal sound zone based on a first plurality of acoustic transfer functions and a second plurality of acoustic transfer functions, the first plurality of acoustic transfer functions comprising acoustic transfer functions between the plurality of acoustic transducers and the personal sound zone, the second plurality of acoustic transfer functions comprising acoustic transfer functions between the plurality of acoustic transducers and one or more monitoring locations outside the personal sound zone.

Example 88 includes the subject matter of Example 87, and optionally, wherein the instructions, when executed, cause the system of sound control to adjust one or more acoustic transfer functions in the first or second pluralities of acoustic transfer functions based on environment acoustic information representing environment acoustic sound at a plurality of predefined environment locations, which are defined with respect to an environment including the one or more personal sound zones.

Example 89 includes the subject matter of Example 87 or 88, and optionally, wherein the instructions, when executed, cause the system of sound control to adjust one or more acoustic transfer functions in the first or second pluralities of acoustic transfer functions based on a change in the location of the personal sound zone.

Example 90 includes the subject matter of any one of Examples 87-89, and optionally, wherein the instructions, when executed, cause the system of sound control to adjust one or more acoustic transfer functions in the first or second pluralities of acoustic transfer functions based on environment parameter information of one or more environmental parameters of an environment including the one or more personal sound zones.

Example 91 includes the subject matter of any one of Examples 85-90, and optionally, wherein the instructions, when executed, cause the system of sound control to determine the set of weight vectors corresponding to the personal sound zone based on a criterion relating to a contrast between a first acoustic energy and a second acoustic energy, wherein the first acoustic energy comprises an acoustic energy at the personal sound zone based on the set of weight vectors corresponding to the personal sound zone, wherein the second acoustic energy comprises an acoustic energy at one or more monitoring locations outside the personal sound zone based on the set of weight vectors corresponding to the personal sound zone.

Example 92 includes the subject matter of Example 91, and optionally, wherein the criterion comprises limiting the first energy based on a volume at which the audio input is to be heard in the personal sound zone, and minimizing the second energy.

Example 93 includes the subject matter of any one of Examples 85-92, and optionally, wherein the weight vector comprises a plurality of weights corresponding to a respective plurality of acoustic frequencies.

Example 94 includes the subject matter of any one of Examples 77-93, and optionally, wherein the instructions, when executed, cause the system of sound control to determine the sound control pattern based on at least first and second audio inputs, the first audio input for a first personal sound zone, the second audio input for a second personal sound zone, and to determine the sound control pattern based on a first plurality of monitoring inputs representing acoustic sound at a first plurality of monitoring sensing locations, which are defined within the first personal sound zone, and a second plurality of monitoring inputs representing acoustic sound at a second plurality of monitoring sensing locations, which are defined within the second personal sound zone.

Example 95 includes the subject matter of any one of Examples 77-94, and optionally, wherein the instructions, when executed, cause the system of sound control to determine the sound control pattern based on an Active Noise Cancellation (ANC) mechanism configured to reduce residual noise from outside of the one or more personal sound zones based on the one or more audio inputs and based on one or more ANC acoustic sensor inputs.

Example 96 includes a apparatus of sound control, the apparatus comprising means for processing one or more audio inputs to be heard in one or more personal sound zones, and a plurality of monitoring inputs, wherein the plurality of monitoring inputs represent acoustic sound at a plurality of predefined monitoring sensing locations, which are defined within the one or more personal sound zones; means for determining a sound control pattern based on the one or more audio inputs, and the plurality of monitoring inputs, the sound control pattern comprising a plurality of sound control signals configured to drive a respective plurality of acoustic transducers such that the one or more audio inputs are to be heard in the one or more personal sound zones; and means for outputting the plurality of sound control signals to the plurality of acoustic transducers.

Example 97 includes the subject matter of Example 96, and optionally, comprising means for receiving environment acoustic information representing environment acoustic sound at a plurality of predefined environment locations, which are defined with respect to an environment including the one or more personal sound zones, and determining the sound control pattern based on the environment acoustic information.

Example 98 includes the subject matter of Example 97, and optionally, wherein the environment acoustic information comprises information of acoustic sound sensed by an acoustic sensor at an environment location of the plurality of predefined environment locations.

Example 99 includes the subject matter of Example 97 or 98, and optionally, wherein the environment acoustic information comprises information of at least one of an audio signal, or acoustic sound generated by a predefined audio source.

Example 100 includes the subject matter of any one of Examples 97-99, and optionally, comprising means for determining a plurality of selected frequencies to be included in the sound control pattern, and selecting the plurality of selected frequencies from a frequency spectrum based on the environment acoustic information and the one or more audio inputs.

Example 101 includes the subject matter of Example 100, and optionally, comprising means for determining the plurality of selected frequencies based on projected audio and projected environment sound, the projected audio is based on a projection of an audio input, which is to be heard at a personal sound zone, by a transfer function from the plurality of transducers to the personal sound zone, the projected environment sound is based on a projection of the environment acoustic sound by a transfer function from a plurality of predefined environment locations to the personal sound zone.

Example 102 includes the subject matter of Example 101, and optionally, comprising means for determining whether a particular frequency is to be included in the plurality of selected frequencies based on the projected audio at the particular frequency and the projected environment sound at the particular frequency.

Example 103 includes the subject matter of Example 102, and optionally, comprising means for determining that the particular frequency is to be included in the plurality of selected frequencies when a difference between the projected audio at the particular frequency and the projected environment sound at the particular frequency is greater than a predefined threshold.

Example 104 includes the subject matter of any one of Examples 96-103, and optionally, comprising means for determining the plurality of sound control signals based on one or more sets of weight vectors corresponding to the one or more personal sound zones, respectively, a set of weight vectors corresponding to a personal sound zone comprising a plurality of weight vectors corresponding to the plurality of acoustic transducers, respectively, a weight vector in the set of weight vectors is based on an acoustic transfer function between an acoustic transducer of the plurality of acoustic transducers and the personal sound zone.

Example 105 includes the subject matter of Example 104, and optionally, comprising means for determining a sound control signal for a particular acoustic transducer by applying to an audio input to be heard in the personal sound zone a weight vector corresponding to the particular acoustic transducer from the set of weight vectors corresponding to the personal sound zone.

Example 106 includes the subject matter of Example 104 or 105, and optionally, comprising means for determining the set of weight vectors corresponding to the personal sound zone based on a first plurality of acoustic transfer functions and a second plurality of acoustic transfer functions, the first plurality of acoustic transfer functions comprising acoustic transfer functions between the plurality of acoustic transducers and the personal sound zone, the second plurality of acoustic transfer functions comprising acoustic transfer functions between the plurality of acoustic transducers and one or more monitoring locations outside the personal sound zone.

Example 107 includes the subject matter of Example 106, and optionally, comprising means for adjusting one or more acoustic transfer functions in the first or second pluralities of acoustic transfer functions based on environment acoustic information representing environment acoustic sound at a plurality of predefined environment locations, which are defined with respect to an environment including the one or more personal sound zones.

Example 108 includes the subject matter of Example 106 or 107, and optionally, comprising means for adjusting one or more acoustic transfer functions in the first or second pluralities of acoustic transfer functions based on a change in the location of the personal sound zone.

Example 109 includes the subject matter of any one of Examples 106-108, and optionally, comprising means for adjusting one or more acoustic transfer functions in the first or second pluralities of acoustic transfer functions based on environment parameter information of one or more environmental parameters of an environment including the one or more personal sound zones.

Example 110 includes the subject matter of any one of Examples 104-109, and optionally, comprising means for determining the set of weight vectors corresponding to the personal sound zone based on a criterion relating to a contrast between a first acoustic energy and a second acoustic energy, wherein the first acoustic energy comprises an acoustic energy at the personal sound zone based on the set of weight vectors corresponding to the personal sound zone, wherein the second acoustic energy comprises an acoustic energy at one or more monitoring locations outside the personal sound zone based on the set of weight vectors corresponding to the personal sound zone.

Example 111 includes the subject matter of Example 110, and optionally, wherein the criterion comprises limiting the first energy based on a volume at which the audio input is to be heard in the personal sound zone, and minimizing the second energy.

Example 112 includes the subject matter of any one of Examples 104-111, and optionally, wherein the weight vector comprises a plurality of weights corresponding to a respective plurality of acoustic frequencies.

Example 113 includes the subject matter of any one of Examples 96-112, and optionally, comprising means for determining the sound control pattern based on at least first and second audio inputs, the first audio input for a first personal sound zone, the second audio input for a second personal sound zone, and determining the sound control pattern based on a first plurality of monitoring inputs representing acoustic sound at a first plurality of monitoring sensing locations, which are defined within the first personal sound zone, and a second plurality of monitoring inputs representing acoustic sound at a second plurality of monitoring sensing locations, which are defined within the second personal sound zone.

Example 114 includes the subject matter of any one of Examples 96-113, and optionally, comprising means for determining the sound control pattern based on an Active Noise Cancellation (ANC) mechanism configured to reduce residual noise from outside of the one or more personal sound zones based on the one or more audio inputs and based on one or more ANC acoustic sensor inputs.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
an input to receive a first audio input for a first personal sound zone, a second audio input for a second personal sound zone, environment information, and monitoring information, wherein the environment information comprises information corresponding to an environment including the first personal sound zone and the second personal sound zone, wherein the monitoring information comprises a first plurality of monitoring inputs representing sound at a first plurality of monitoring locations, which are defined within the first personal sound zone, and a second plurality of monitoring inputs representing sound at a second plurality of monitoring locations, which are defined within the second personal sound zone;
a controller configured to determine a sound control pattern based on the first audio input, the second audio input, the environment information, the first plurality of monitoring inputs, and the second plurality of monitoring inputs, wherein the sound control pattern comprises a plurality of sound control signals configured to drive a respective plurality of acoustic transducers such that the first audio input is to be heard in the first personal sound zone; and
an output to output the plurality of sound control signals to the plurality of acoustic transducers.

2. The apparatus of claim 1, wherein the controller is configured to determine the sound control pattern such that the first audio input is to be heard in the first personal sound zone with a first sound intensity, and such that the first audio input is not to be heard with more than a second sound intensity outside the first personal sound zone, wherein the second sound intensity is less than the first sound intensity.

3. The apparatus of claim 1, wherein the controller is configured to determine the sound control pattern based on a criterion relating to a first acoustic energy and a second acoustic energy, wherein the first acoustic energy comprises an acoustic energy corresponding to the first audio input based on the sound control pattern in the first personal sound zone, wherein the second acoustic energy comprises an acoustic energy corresponding to the first audio input based on the sound control pattern at one or more locations outside the first personal sound zone.

4. The apparatus of claim 3, wherein the criterion comprises limiting the first acoustic energy according to a first energy limit, and limiting the second acoustic energy according to a second energy limit, wherein the first energy limit is different from the second energy limit.

5. The apparatus of claim 4, wherein the first energy limit is greater than the second energy limit.

6. The apparatus of claim 3, wherein the criterion comprises limiting the first acoustic energy based on a setting at which the first audio input is to be heard in the first personal sound zone.

7. The apparatus of claim 3, wherein the criterion comprises limiting the first acoustic energy based on a volume at which the first audio input is to be heard in the first personal sound zone.

8. The apparatus of claim 3, wherein the criterion comprises minimizing the second acoustic energy.

9. The apparatus of claim 3, wherein the criterion comprises limiting the first acoustic energy based on a setting at which the first audio input is to be heard in the first personal sound zone, and minimizing the second acoustic energy.

10. The apparatus of claim 1, wherein the controller is configured to determine the sound control pattern such that the first audio input is to be heard in the first personal sound zone according to a user preference.

11. The apparatus of claim 1, wherein the controller is configured to determine the sound control pattern based on a set of weight vectors corresponding to the first personal sound zone, the set of weight vectors corresponding to the first personal sound zone comprising a plurality of weight vectors corresponding to the plurality of acoustic transducers, respectively, wherein a weight vector in the set of weight vectors is based on an acoustic transfer function between an acoustic transducer of the plurality of acoustic transducers and the first personal sound zone.

12. The apparatus of claim 11, wherein the weight vector comprises a plurality of weights corresponding to a respective plurality of acoustic frequencies.

13. The apparatus of claim 11, wherein the controller is configured to determine a sound control signal for a particular acoustic transducer by applying to the first audio input a weight vector corresponding to the particular acoustic transducer from the set of weight vectors corresponding to the first personal sound zone.

14. The apparatus of claim 11, wherein the controller is configured to determine the set of weight vectors corresponding to the first personal sound zone based on a first plurality of acoustic transfer functions and a second plurality of acoustic transfer functions, wherein the first plurality of acoustic transfer functions comprises acoustic transfer functions between the plurality of acoustic transducers and the first personal sound zone, wherein the second plurality of acoustic transfer functions comprises acoustic transfer functions between the plurality of acoustic transducers and one or more locations outside the first personal sound zone.

15. The apparatus of claim 14, wherein the controller is configured to determine one or more acoustic transfer functions in at least one of the first plurality of acoustic transfer functions or the second plurality of acoustic transfer functions based on the environment information.

16. The apparatus of claim 14, wherein the controller is configured to determine one or more acoustic transfer functions in the first plurality of acoustic transfer functions based on a location of the first personal sound zone.

17. The apparatus of claim 1, wherein the environment information comprises information of one or more environmental parameters corresponding to one or more environment locations.

18. The apparatus of claim 1, wherein the environment information comprises temperature information corresponding to a temperature at one or more environment locations.

19. The apparatus of claim 1, wherein the environment information comprises information from a vehicular system of a vehicle comprising the first personal sound zone and the second personal sound zone.

20. The apparatus of claim 1, wherein the environment information comprises environment sound information representing environment sound at one or more environment locations.

21. The apparatus of claim 1, wherein the environment information comprises information of sound sensed by an acoustic sensor at an environment location.

22. The apparatus of claim 1, wherein the environment information comprises information of at least one of an audio signal or acoustic sound generated by a predefined audio source.

23. The apparatus of claim 1, wherein the controller is configured to identify a plurality of selected frequencies in a frequency spectrum based on the environment information, wherein the controller is configured to determine the sound control pattern comprising the plurality of selected frequencies and excluding one or more non-selected frequencies in the frequency spectrum.

24. An apparatus comprising:
an input to receive an audio input to be heard in a personal sound zone, environment information, and monitoring information, wherein the environment information comprises information corresponding to an environment including the personal sound zone, wherein the monitoring information comprises a plurality of monitoring inputs representing sound at a plurality of monitoring locations, which are defined within the personal sound zone;
a controller configured to determine a sound control pattern based on the audio input, the environment information, and the plurality of monitoring inputs, wherein the sound control pattern comprises a plurality of sound control signals configured to drive a respective plurality of acoustic transducers such that the audio input is to be heard in the personal sound zone, wherein the controller is configured to identify a plurality of selected frequencies in a frequency spectrum based on the environment information, wherein the controller is configured to identify the plurality of selected frequencies based on projected audio and projected environment sound, wherein the projected audio is based on a projection of the audio input by a transfer function from the plurality of acoustic transducers to the personal sound zone, wherein the projected environment sound is based on a projection of environment sound by a transfer function from one or more environment locations to the personal sound zone, wherein the controller is configured to determine the sound control pattern comprising the plurality of selected frequencies and excluding one or more non-selected frequencies in the frequency spectrum; and
an output to output the plurality of sound control signals to the plurality of acoustic transducers.

25. The apparatus of claim 24, wherein the controller is configured to determine whether a particular frequency is to be included in the plurality of selected frequencies or excluded from the plurality of selected frequencies based on the projected audio at the particular frequency and the projected environment sound at the particular frequency.

26. The apparatus of claim 25, wherein the controller is configured to determine that the particular frequency is to be included in the plurality of selected frequencies when a difference between the projected audio at the particular frequency and the projected environment sound at the particular frequency is greater than a predefined threshold.

27. The apparatus of claim 1, wherein the controller is configured to determine the sound control pattern such that the second audio input is to be heard in the second personal sound zone.

28. The apparatus of claim 1, wherein the controller is configured to determine the sound control pattern to focus the first audio input towards the first personal sound zone and to focus the second audio input towards the second personal sound zone.

29. A system comprising:
a seat; and
a sound control system configured to control sound within a personal sound zone defined with respect to the seat, the sound control system comprising:
a plurality of monitoring acoustic sensors to sense acoustic sound at a plurality of monitoring sensing locations, which are defined within the personal sound zone;
a plurality of acoustic transducers; and
a controller configured to determine a sound control pattern based on an audio input to be heard in the personal sound zone, environment information, and monitoring information, wherein the environment information comprises information corresponding to an environment including the personal sound zone, wherein the monitoring information is based on a plurality of monitoring inputs from the plurality of monitoring acoustic sensors, wherein the sound control pattern comprises a plurality of sound control signals configured to drive the plurality of acoustic transducers, respectively, such that the audio input is to be heard in the personal sound zone, wherein the controller is configured to identify a plurality of selected frequencies in a frequency spectrum based on the environment information, wherein the controller is configured to identify the plurality of selected frequencies based on projected audio and projected environment sound, wherein the projected audio is based on a projection of the audio input by a transfer function from the plurality of acoustic transducers to the personal sound zone, wherein the projected environment sound is based on a projection of environment sound by a transfer function from one or more environment locations to the personal sound zone, wherein the controller is configured to determine the sound control pattern comprising the plurality of selected frequencies and excluding one or more non-selected frequencies in the frequency spectrum.

30. The system of claim 29, wherein the personal sound zone is configured to surround an area defined with respect to a headrest of the seat.

31. The system of claim 29 comprising a vehicle.

32. A product comprising one or more tangible computer-readable non-transitory storage media comprising computer-executable instructions operable to, when executed by at least one processor, enable the at least one processor to cause a system of sound control to:
determine a sound control pattern based on a first audio input for a first personal sound zone, a second audio input for a second personal sound zone, environment information, and monitoring information, wherein the environment information comprises information corresponding to an environment including the first personal sound zone and the second personal sound zone, wherein the monitoring information comprises a first plurality of monitoring inputs representing sound at a first plurality of monitoring locations, which are defined within the first personal sound zone, and a second plurality of monitoring inputs representing sound at a second plurality of monitoring locations, which are defined within the second personal sound zone, wherein the sound control pattern comprises a plurality of sound control signals configured to drive a respective plurality of acoustic transducers such that the first audio input is to be heard in the first personal sound zone; and output the plurality of sound control signals to the plurality of acoustic transducers.

33. The product of claim 32, wherein the instructions, when executed, cause the system of sound control to determine the sound control pattern based on a criterion relating to a first acoustic energy and a second acoustic energy, wherein the first acoustic energy comprises an acoustic energy corresponding to the first audio input based on the sound control pattern in the first personal sound zone, wherein the second acoustic energy comprises an acoustic energy corresponding to the first audio input based on the sound control pattern at one or more locations outside the first personal sound zone.

* * * * *